US009297723B1

(12) United States Patent
Hofmann et al.

(10) Patent No.: US 9,297,723 B1
(45) Date of Patent: Mar. 29, 2016

(54) TRACKING AND ANALYZING SERVICE OUTAGES

(71) Applicant: American Public Power Association Inc., Arlington, VA (US)

(72) Inventors: Alexander Hofmann, Silver Spring, MD (US); Michael John Hyland, Huntingtown, MD (US)

(73) Assignee: American Public Power Association Inc., Arlington, VA (US)

( * ) Notice: Subject to any disclaimer, the term of this patent is extended or adjusted under 35 U.S.C. 154(b) by 0 days.

(21) Appl. No.: 14/541,924

(22) Filed: Nov. 14, 2014

Related U.S. Application Data

(60) Provisional application No. 61/904,663, filed on Nov. 15, 2013.

(51) Int. Cl.
*G01W 1/00* (2006.01)
*G06Q 10/00* (2012.01)
*G01M 99/00* (2011.01)
*G06N 99/00* (2010.01)

(52) U.S. Cl.
CPC ............... *G01M 99/00* (2013.01); *G01W 1/00* (2013.01); *G06N 99/005* (2013.01)

(58) Field of Classification Search
CPC ....... G06Q 50/06; G06Q 10/06; G06Q 10/04; Y04S 10/54; Y04S 20/224; G01M 99/00; G01W 1/00; G06N 99/005
USPC ............... 702/184, 2, 3, 4, 15, 34, 35, 58, 59, 702/185, 188; 705/7.23, 7.25, 7.28; 700/291, 295, 293, 294, 297; 709/203, 709/223; 706/12, 25, 45, 46, 48; 715/700, 715/734
See application file for complete search history.

(56) References Cited

U.S. PATENT DOCUMENTS

| 8,682,623 | B1 * | 3/2014 | Domijan et al. .................. 703/2 |
| 2012/0007707 | A1 * | 1/2012 | Matai ............................... 336/90 |
| 2012/0150460 | A1 * | 6/2012 | Balcerek et al. ................. 702/58 |
| 2012/0173296 | A1 * | 7/2012 | McMullin ..................... 705/7.14 |
| 2013/0198847 | A1 * | 8/2013 | Sampigethaya ................ 726/25 |
| 2014/0012941 | A1 |  1/2014 | Smith et al. |
| 2014/0081998 | A1 * | 3/2014 | Fan et al. ...................... 707/754 |

(Continued)

OTHER PUBLICATIONS

Rudin, Cynthia. "Machine Learning for the New York City Power Grid"., IEEE Transactions on Pattern Analysis and Machine Intelligence, vol. 34, No. 2, Feb. 2012.*

(Continued)

*Primary Examiner* — Gregory J Toatley
*Assistant Examiner* — Yoshihisa Ishizuka
(74) *Attorney, Agent, or Firm* — Fish & Richardson P.C.

(57) ABSTRACT

Methods, systems, and apparatus, including computer-readable storage devices, for tracking and analyzing service outages. Weather data and outage data are accessed. Based on the weather data and the outage data, weather conditions corresponding to service outages are identified. A machine learning system is trained to estimate training a machine learning system to estimate effects of weather conditions on utility systems. Data for a particular utility system is provided to the trained machine learning system, and in response, output indicating estimated effects of future weather conditions on the particular utility system is received. The information that indicates the estimated effects of future weather conditions on the particular utility system is provided for display.

17 Claims, 18 Drawing Sheets

(56) References Cited

U.S. PATENT DOCUMENTS

| | | | |
|---|---|---|---|
| 2014/0129919 A1* | 5/2014 | Benson | 715/234 |
| 2014/0257913 A1* | 9/2014 | Ball et al. | 705/7.25 |

OTHER PUBLICATIONS

Waters, C. and Lawton, C. (2011) Red Squirrel Translocation in Ireland. Irish Wildlife Manuals, No. 51. National Parks and Wildlife Service, Department of the Environment, Heritage and Local Government, Dublin, Ireland.*

Brown, Richard . Electric Power Distribution Reliability Second Edition. CRC Press, 2009, pages.*

US Energy Information Administration, Today in Energy Electricity restored to many in the Northeast but outages persist Nov. 9, 2012.*

Hann, Norm., "Investigation of the 2.5 Beta Methodology"., IEEE Transactions on Power Systems, vol. 26 No. 4 Nov. 2011.*

"Major Event Normalization," Working Group on System Design, IEEE Power Engineering Society, Oct. 29, 2001, Retreived from the Internet: <URL: http://grouper.ieee.org/groups/td/dist/sd/doc/2002-08-WhitePaperMajorEvent.pdf>, 8 pages.

"Major Event/Abnormal/Normal Event Definition," IEEE, Mar. 12, 2002. Retreived from the Internet: <URL: http://grouper.ieee.org/groups/td/dist/sd/doc/2002-03-webex.pdf>, 9 pages.

"Progress Energy Carolinas Response to NCUC & Public Staff Data Request No. 1, Dec. 4-13, 2002 Ice Storm, Jan. 15, 2003" Jul. 10, 2008. Retreived from the Internet: <URL: http://grouper.ieee.org/groups/td/dist/sd/doc/2003-01-Ice-Storm-Data-Request.pdf>, 34 pages.

Agüero and Xu, "Predictive Distribution Reliability Practice Survey Results," Jan. 14, 2014. Retrieved from the Internet: <URL: http://grouper.ieee.org/groups/td/dist/sd/doc/2014-01%20Predictive%20Distribution%20Reliability%20Practice%20Survey%20Results.pdf>, 15 pages.

Angalakudati et al., "Improving Emergency Storm Planning using Machine Learning," Draft of paper for T&D Conference and Exposition, 2014 IEEE PES, 6 pages, Dec. 2012.

Ballijepalli et al., "Predicting Distribution System Performance against Reliability Standards," Sep. 2, 2003. Retrieved from the Internet: <URL: http://grouper.ieee.org/groups/td/dist/sd/doc/2003-09- RegCritPESGM03RichChristie.pdf> 27 pages.

Christie et al., "P1366 Major Event Day Language Draft 2.5 Beta Method," Aug. 12, 2002. Retrieved from the Internet: <URL: http://grouper.ieee.org/groups/td/dist/sd/doc/2002-08-P1366MajorEventDayLanguageDraft4.pdf>, 6 pages.

Eto, "Trends in Major Events Days over Time," Jan. 13, 2015. Retrieved from the Internet: <URL: http://grouper.ieee.org/groups/td/dist/sd/doc/2015-01%20Trends%20in%20Major%20Events%20Days%20over%20Time%20-Joseph%20Eto.pdf>, 12 pages.

Warren et al., "Classification of Major Event Days," Jan. 22, 2003. Retrieved from the Internet: <URL: http://grouper.ieee.org/groups/td/dist/sd/doc/2003-01-Major-Events-Classification-v3.pdf>, 6 pages.

Warren et al., "Descriptions of Candidate Major Event Day Classification Methods," Feb. 8, 2002. Retrieved from the Internet: <URL: http://grouper.ieee.org/groups/td/dist/sd/doc/2002-02-DescribedThreeBeta.doc>, 4 pages.

Warren, "Simplified Explanation of the Three-Beta Method," Feb. 19, 2002. Retrieved from the Internet <URL: http://grouper.ieee.org/groups/td/dist/sd/doc/2002-02-SimplifiedThreeBeta.doc>, 2 pages.

Williams, "Update on IEEE 1366: Major Event Definition," Working Group on System Design, IEEE, Oct. 29, 2001. Retrieved from the Internet: <URL: http://grouper.ieee.org/groups/td/dist/sd/doc/2001-10-majorevent.pdf>, 25 pages.

Xu, "Predictive Reliability Study," Jan. 15, 2013. Retrived from the Internet: <URL: http://grouper.ieee.org/groups/td/dist/sd/doc/2013-01%20Predictive%20Reliability%20Study.pdf>, 15 pages.

Hann et al., "Investigation of the 2.5 Beta Methodology," IEEE Transactions on Power Systems, 26(4):2577-2578, Nov. 2011.

* cited by examiner

| Cause of Interuption | | | |
| --- | --- | --- | --- |
| Cause level 1 | Cause level 2 | Cause level 3 | Cause level 4 |
| Unscheduled | Public | Vandalism | |
| | | Human Accident | |
| | | Vehicle Accident | |
| | | Contact with Foreign Object | |
| | | Non-Utility Fire | |
| | | Non-Utility Excavation | |
| | Natural | Lightning | Direct Stroke |
| | | | Lightning-Induced Flashover |
| | | | Unknown/Other |
| | | Wildlife | Squirrel |
| | | | Snake |
| | | | Bird |
| | | | Other |
| | | Weather | Storm |
| | | | Ice |
| | | | Wind |
| | | | Heat |
| | | Vegetation | Tree |
| | | | Vine |
| | | | Other |
| | Equipment | Electrical Failure | |
| | | Equipment Worn Out | |
| | | Equipment Damage | |
| | | Manufacturing Defect | |
| | Power Supply | Overloaded | |
| | | Loss of Generating Unit | |
| | | Failure of Greater Transmission | |
| | Utility Human Error | Construction | |
| | | Maintenance | |
| | | Operations | |
| | Unknown | | |
| Scheduled | Non-Utility Construction | Commercial Construction | Non-Utility Employee |
| | | | Contractor-Dig-In |
| | | Residential Construction | |
| | | Road construction | |
| | Non-Customer Requests | Police Department | |
| | | Fire Department | |
| | Customer Service | Non-Payment | |
| | | Relocation | |
| | | Repairs | |
| | Utility Maintenance and Repairs | Load Swap | |
| | | Equipment Replacement | |

FIG. 12

TRACKING AND ANALYZING SERVICE OUTAGES

CROSS-REFERENCE TO RELATED APPLICATION

This application claims priority from U.S. Provisional Application No. 61/904,663, filed Nov. 15, 2013, and titled "Tracking and Analyzing Service Outages," which is incorporated by reference.

TECHNICAL FIELD

This disclosure relates to tracking and analyzing of service outages, such as interruptions of electric power.

BACKGROUND

From time to time, the services provided by utilities and other service providers may be interrupted. The causes and characteristics of service disruptions can vary widely.

SUMMARY

A system can track and analyze service outages to assist utilities and other service providers in responding to service outages and avoiding service outages. For example, users or machines associated with various utilities can input information about service outages, such as electric power outages. The system can provide reports that provide information about outages that have occurred. The system can also use information about prior service outages and other information, such as weather, news, and social media information, to predict characteristics of future outages. The system may also provide recommendations for maintenance and other preventative action to mitigate the effects of future outages.

In one general aspect, a method performed by one or more computers includes: accessing weather data that indicates different weather conditions occurring in a geographic area over a range of time; accessing outage data that indicates service outages occurring in the geographic area over the range of time, where each service outage has a corresponding time of occurrence, a corresponding utility system, and a corresponding geographic location in the geographic area; based on the weather data and the outage data, identifying, for each of the service outages, a weather condition that occurred at the corresponding geographic location of the service outage at the corresponding time of occurrence of the service outage; training a machine learning system to estimate effects of weather conditions on utility systems using (i) characteristics of the respective service outages and (ii) the identified weather conditions for the respective service outages; providing, to the trained machine learning system, data for a particular utility system; in response to providing the data for the particular utility system, receiving from the trained machine learning system, output indicating estimated effects of future weather conditions on the particular utility system; and providing, for display, information that indicates the estimated effects of future weather conditions on the particular utility system.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, accessing the outage data includes accessing outage data that indicates electric power outages of multiple different electric utility systems, the outage data indicating, for each of the electric power outages, (i) an outage type selected from a set of multiple different outage types and (ii) a cause attributed to the electric power outage that is selected from a set of multiple different outage causes. Training the machine learning system includes training the machine learning system to generate, given a set of weather conditions and system characteristics, outputs that include probabilities that electrical power outages will occur at different electric utility systems or different geographic locations in response to the set of weather conditions. The outputs further indicate: outage types, from the set of multiple outage types, that are likely in response to the set of weather conditions; and outage causes, from the set of multiple different outage causes, that are likely in response to the set of weather conditions. The multiple different outage causes include items, such as vandalism, accident, fire, excavation, lightning, wildlife, weather, vegetation, or equipment failure. The multiple different outage types include items, such as a pole outage, a transformer failure, or a phase failure.

Implementations may include one or more of the following features. For example, training the machine learning system to estimate effects of weather conditions on utility systems includes training the machine learning system to provide, based on information about a utility system, a system score or resiliency curve that is indicative of resiliency of the utility system in response to one or more weather conditions or other conditions. Providing, to the trained machine learning system, the data for the particular utility system includes providing an identifier for the particular utility system, a geographic location associated with the particular utility system, or data indicating characteristics of the particular utility system. Receiving from the trained machine learning system, output indicating estimated effects of future weather conditions on the particular utility system includes receiving a system score for the particular utility system. Providing, for display, information that indicates the estimated effects of future or pending weather conditions on the particular utility system includes providing the system score or resiliency curve of the particular utility system for display. This score or curve can be created for different system components or collections of system components. For example, the score or curve may indicateparticular feeder's resistance to outages caused by varying wind strength or direction.

Implementations may include one or more of the following features. For example, the method may include receiving, from the trained machine learning system, a system score for each of multiple different utility systems. The method may include grouping the utility systems into multiple different groups based on the system scores for the multiple different utility systems, the multiple different groups comprising a group that includes the particular utility system and one or more other utility systems. The method may include estimating an amount of time needed to restore service after a service outage in the particular utility system based on service restoration times for the one or more other utility systems that are in the group that includes the particular utility system. The method may include providing, for display, the estimated amount of time needed to restore service after a service outage in the particular utility system.

Implementations may include one or more of the following features. For example, training the machine learning system to estimate effects of weather conditions on utility systems includes training the machine learning system to estimate, given a geographic location and one or more weather conditions, effects of the one or more weather conditions in causing service outages at the geographic location. The method may include: accessing data indicating a set of weather conditions; receiving, from the trained machine learning system, outputs indicating estimated effects of the set of weather conditions at multiple different geographic locations; generating, based on the outputs of the machine learning system, a map that indicates different effects of the set of weather at the different geographic locations; and providing the map for display. Accessing data indicating a set of weather conditions includes accessing data indicating a forecast of future weather conditions; receiving, from the trained machine learning system, outputs indicating estimated effects of the set of weather conditions at multiple different geographic locations includes receiving outputs indicating probabilities that service outages will occur as a result of the forecasted weather conditions; and generating the map includes generating a map that indicates the probabilities that service outages will occur as a result of the forecasted weather conditions. Accessing data indicating a set of weather conditions includes receiving user input indicating weather conditions; machine to machine communications providing system or weather data; receiving, from the trained machine learning system, outputs indicating estimated effects of the set of weather conditions at multiple different geographic locations includes receiving outputs indicating probabilities that service outages will occur as a result of the weather conditions indicated by the user input; and generating the map includes generating a map that indicates the probabilities that service outages will occur as a result of the weather conditions indicated by the user input.

Implementations may include one or more of the following features. For example, training the machine learning system to estimate effects of the one or more weather conditions includes training the machine learning system to provide an output that indicates: a likelihood of occurrence of a service outage; an estimate of a duration of a service outage; an estimate of number of customers affected by a service outage; or an estimate of an area affected by a service outage. The method includes generating, for a particular utility system or a particular geographic location, a recommendation for conducting maintenance, placing of equipment or crew, or budgeting, where the recommendation is based at least in part on output of the machine learning system. Training the machine learning system includes training a machine learning system that includes an artificial neural network, a support vector machine, a decision tree, a regression model, a maximum entropy classifier, or a model based on a genetic algorithm, or a model based on a clustering algorithm. Training can include training a set of customized statistical models that group utilities based on underlying data patterns over time.

In another general aspect, a method includes: receiving outage data; indicating service outages associated with a utility; processing the received outage data; storing the processed outage data; receiving a request; determining information relevant to the request using the stored outage data; and providing the determined information in response to the request.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, receiving the request comprises receiving data indicating filter parameters that specify a subset of the stored outage data. Determining information relevant to the request comprises determining the information relevant to the request based on the subset of the stored outage data. The method includes receiving additional information from a computing system over a network. Determining the information relevant to the request comprises generating a prediction or recommendation for the utility based on the additional information. Determining the information relevant to the request includes: inputting information regarding a utility to a machine learning module that has been trained based on the stored outage data; receiving output from the machine learning module; and determining a prediction or recommendation based on the output of the machine learning module. Determining the information relevant to the request comprises generating one or more statistical measures, a chart, a graph, a map, or a list of service outages.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description, below. Other features of the disclosure will be apparent from the description and drawings, and from the claims.

BRIEF DESCRIPTION OF THE DRAWINGS

FIG. 6 is a diagram illustrating an example of a user interface for entering equipment and service information.

FIGS. 7A and 7B are diagrams illustrating examples of user interfaces for filtering data and requesting reports.

FIGS. 8A-8E are diagrams illustrating examples of user interfaces providing reports regarding outages.

FIG. 12 is a table illustrating causes of service outages.

DETAILED DESCRIPTION

Like reference numbers and designations in the various drawings indicate like elements.

A reliability tracking system can assist service utilities and other service providers in collecting, categorizing, and reporting information about services provided. For example, the tracking system may be used to obtain and process information about electric utility service outages and to generate reports in response to queries. As discussed further below, various aspects of the tracking system can be used to provide insights to service providers. For example, the tracking system can use collected data to classify events, service providers, and service regions. As another example, the tracking system can provide predictions of maintenance needs, the likelihood and extent of service disruptions, and times for service restoration. The tracking system can also provide recommendations to improve service, for example, measures to proactively limit the extent of future service disruptions and measures to respond effectively to severe weather and other forecasted disruptions.

Figure 1:
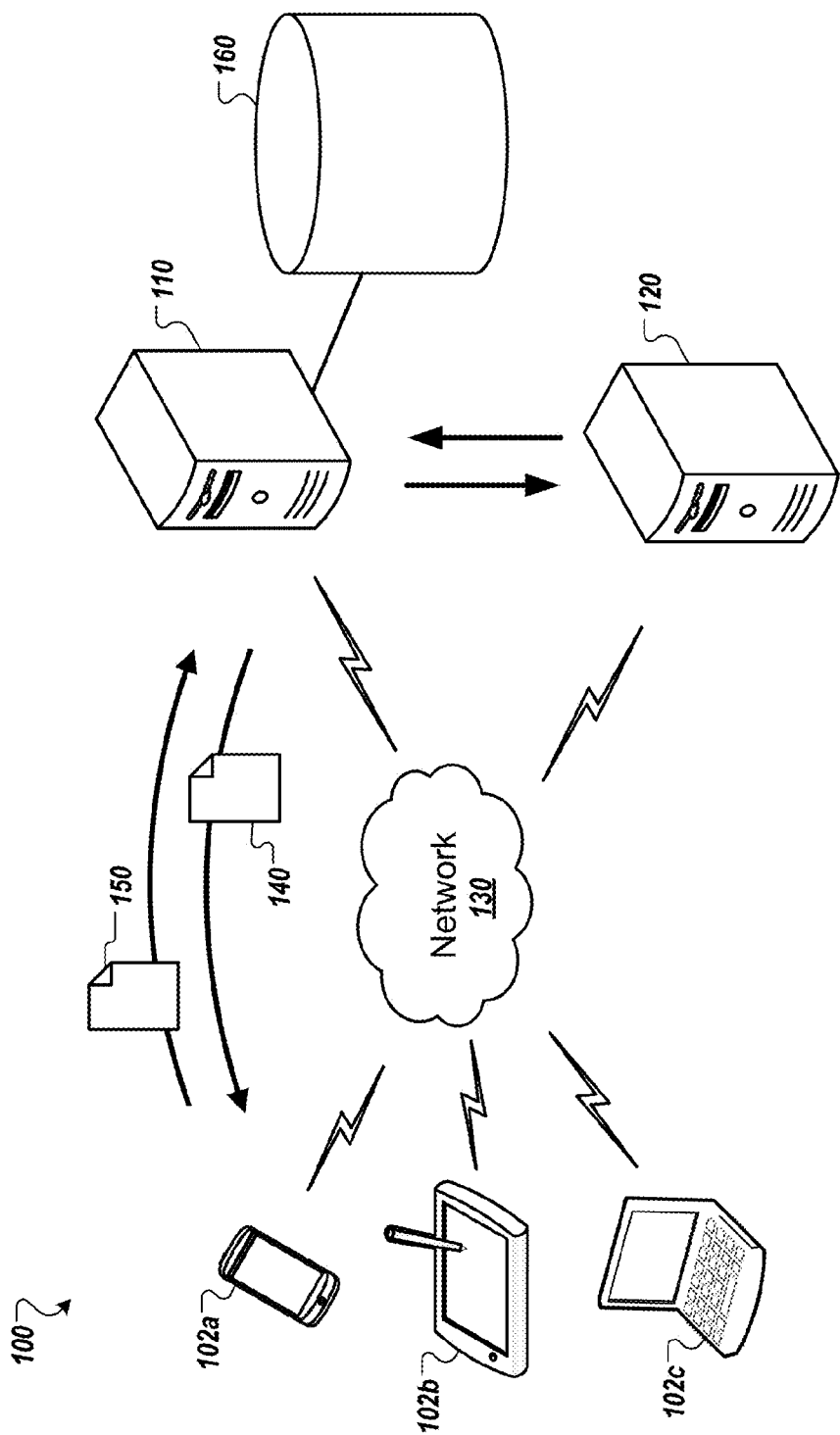
FIG. 1 is a block diagram illustrating an example of a system for tracking and analyzing of service outages.

FIG. 1 is a block diagram that illustrates an example of a system 100 for tracking and analyzing service outages. The system 100 includes a tracking system 110 that receives, processes, and stores information about service outages. The tracking system 100 can also provide reports and other data.

The system 100 also includes client devices 102a-102c, a computing system 120, and a network 130. The client devices 102a-102c can be any of, for example, a desktop computer, a laptop computer, a cellular phone, a smart phone, a tablet computer, a music player, an e-book reader, a navigation system, a smart meter, a smart substation relay, a smart appliance, a remote weather station, or other device. The functions performed by the computing systems 110, 120 can be performed by individual computer systems or can be distributed across multiple computer systems. The network 130 can be wired or wireless or a combination of both, and may include private networks and/or public networks, such as the Internet.

In the example of FIG. 1, the tracking system 110 provides data 140, such as web pages or other resources, that can provide user interfaces for interacting with the tracking system 110. Examples of user interfaces that may be provided are shown in FIGS. 4-8E. These user interfaces can be displayed on the client devices 102a-102c, allowing users to enter data 150 about service outages, and the data 150 is transmitted to the tracking system 110.

In some implementations, a user uses one of the client devices 102a-102c to navigate to a web page provided by the tracking system 110. The user logs in with a user name and password, and after the tracking system authenticates the user, the user is provided access to various aspects of the tracking system. For example, the user may then create records of outages, view outage data, and request reports as discussed further below.

When a user or machine provides information about an outage, the tracking system 110 stores the information in data storage 160, for example, a database or other data storage system. The tracking system 110 can store and process information about outages from multiple service providers and geographic regions. The tracking system 110 can use the aggregated data to provide insight to service providers beyond what could be determined from considering only the data of a single service provider. The tracking system 110 may use aggregated information, for example, to classify service providers and service regions, and to make recommendations or predictions to assist the service providers.

In some implementations, the tracking system 110 requests data from other sources, such as the computing system 120, to determine insights and provide data to users. For example, the tracking system 110 may request current, forecasted, or historical weather information from a source of weather data. As another example, the tracking system 110 may request information about social networking posts, search queries, or other information that can indicate current trends or topics of interest. The tracking system 110 can use the additional data, along with outage data collected from one service provider or multiple service providers, for prediction, classification, mapping, forecasting, and providing insight into business decisions in uncertain contexts.

Figure 2:
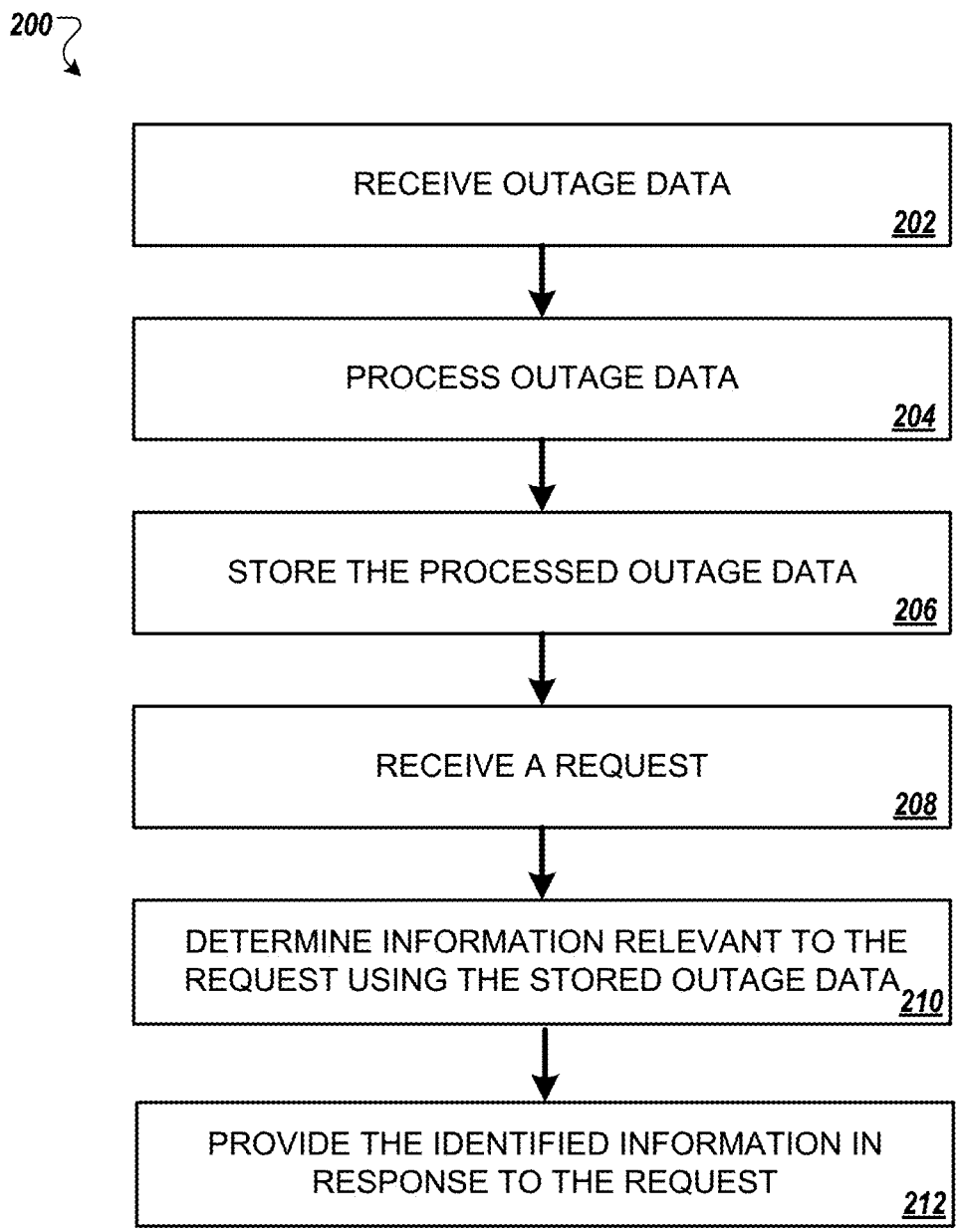
FIGS. 2 and 3 are flow diagrams illustrating methods for tracking and analyzing service outages.

FIG. 2 is a flow diagram illustrating a method 200 for tracking and analyzing service outages. The method 200 is described below as being performed by the tracking system 110, but may be performed by another computing system.

The tracking system 110 receives outage data (202). For example, the tracking system 110 received input provided by a user or machine that indicates that an outage has occurred. The outage data may include, for example, one or more of a location of the outage, a time and date the outage began, a time and date the outage ended, and a cause of the outage. The outage data may also include, for example, a number of customers affected, characteristics of the system that is affected, and other details. For an electric utility, the outage data may indicate, for example, a substation and circuit affected by the outage, a system voltage, a circuit type, an amount of load interrupted, and other information. The tracking system 110 may receive information about outages associated with different utilities.

The tracking system 110 processes the outage data (204). For example, the tracking system 110 can aggregate the received outage data with other outage data from the same service provider or service area. The tracking system 110 may also aggregate the received data with outage data from other service providers that are determined to have similar characteristics. For example, data may be aggregated from two service providers that have similar resiliency curves and machine-adjusted definitions or major events. The tracking system 110 then stores the processed outage data (206).

The tracking system 110 receives a request (208). The request may be a query or other submission. For example, a user may request a report about outages associated with the user's utility. The request may specify a time range, outage type, set of outage causes, or other parameters that indicate the type of information desired and the set of outage data to be used in generating a response.

Using the stored outage data, the tracking system 110 determines information relevant to the request (210). For example, where a user has selected a time range for a report, the tracking system 110 identifies records of outages that occurred within the specified time range. Similarly, if the user has specified a particular outage cause, the tracking system 110 identifies outage records that list the specified cause. The tracking system may generate a variety of types of information in response to the request, including statistics, charts, graphs, maps, and so on.

The tracking system 110 provides the determined information in response to the request (212). In some implementations, the tracking system 110 may provide information from specific records determined to be relevant to the user's request. As an example, the information provided may include individual records of specific outages. As another example, the information may include information about events that represent groups of multiple outages. The information may include statistics, graphs, maps, or other analysis results that the tracking system 110 generates based on the stored outage data. The information provided may include recommendations or predictions that the tracking system 110 generates based on the stored outage data.

Figure 3:
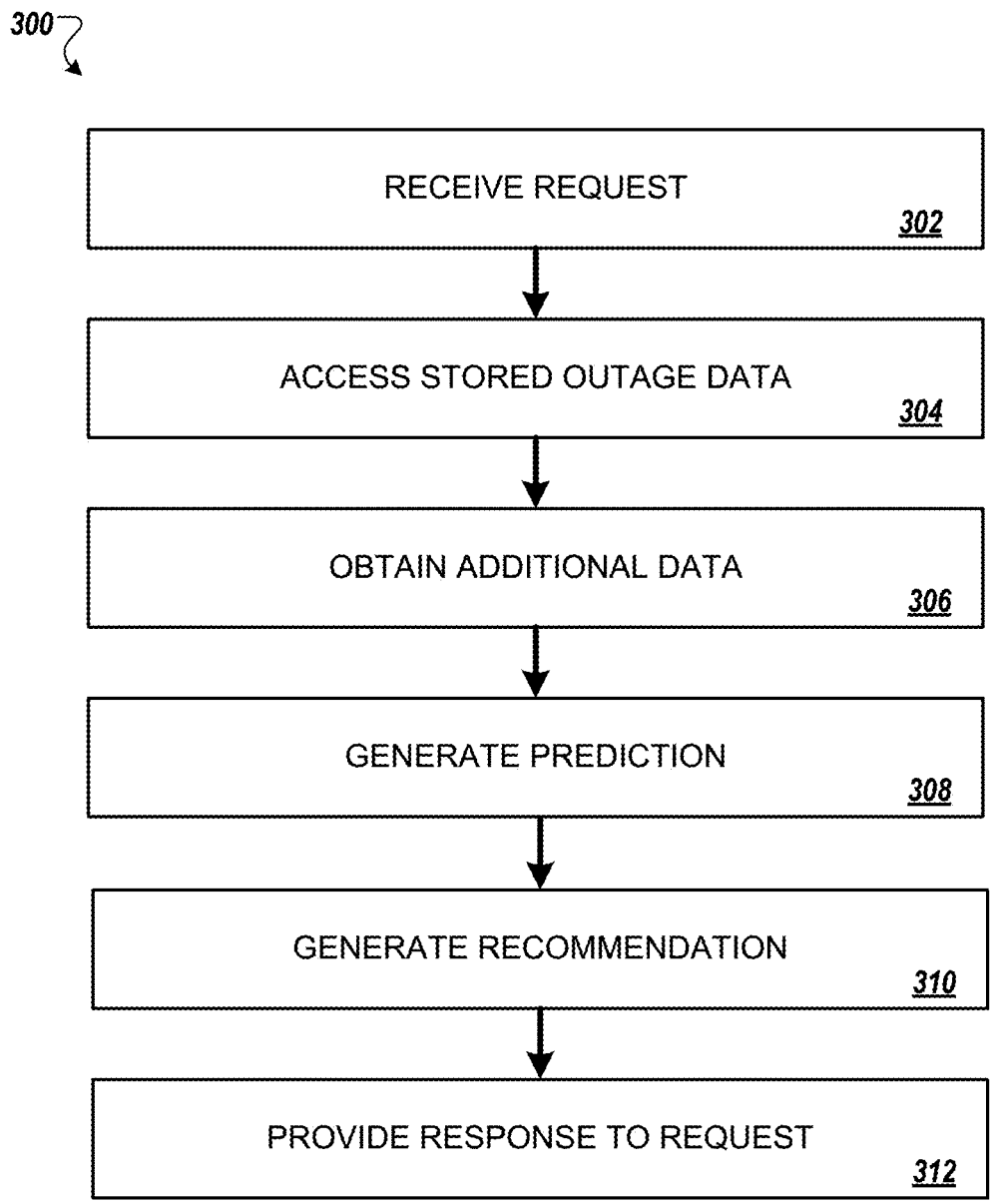

FIG. 3 is a flow diagram illustrating an example of a method 300 for tracking and analyzing service outages. The method 300 is described below as being performed by the tracking system 110, but may be performed by another computing system.

The tracking system 110 received a request (302). For example, the tracking system 110 may receive a query or other submission from one of the client devices 102a-102c. The request may be associated with particular utility, for example, the utility associated with a user that has logged into the system.

The tracking system 110 accesses stored outage data (304). The tracking system may access records of outages corresponding to the particular utility associated with the request. The tracking system 110 may also access records of other utilities, for example, utilities that have characteristics in common with the particular utility.

The tracking system 110 also accesses additional data (306). The additional data can be requested and received from one or more other computing systems or independent data providers. Examples of additional data that may be obtained include geographic data, weather data, Internet search query data, social media data, news data, and government agency data (e.g., from the Public Utilities Commission (PUC) or Energy Information Administration (EIA)).

Using the outage data and the additional data, the tracking system 110 may generate one or more predictions regarding the utility (308). For example, based on weather forecasts and the particular utility's history of outages during similar weather conditions, the tracking system 110 can predict the effects of a current or future storm, such as the likely number of customers affected, the locations and type of equipment affected, and the duration of the outages.

Using the outage data and the additional data, the tracking system 110 may generate one or more recommendations for the utility (310). For example, the tracking system may recommend preventative maintenance based on the age of the utility's infrastructure and causes of recent outages. As another example, the tracking system may recommend requesting assistance through mutual aid agreements, or may recommend locations to place line trucks or other equipment, to deal with predicted outages.

The tracking system 110 provides the predictions and/or recommendations in response to the request (312). The information provided can assist the utility to respond quickly to new outages and to take preventative steps to avoid outages.

In some implementations, rather than providing information in response to a request, the tracking system 110 may provide information in response to determining that a predetermined set of conditions has occurred. For example, the tracking system 110 may monitor weather data, and when a particular set of weather conditions is forecasted or occurs, the tracking system 110 can provide recommendations or predictions to utilities that may be affected.

Figure 4:
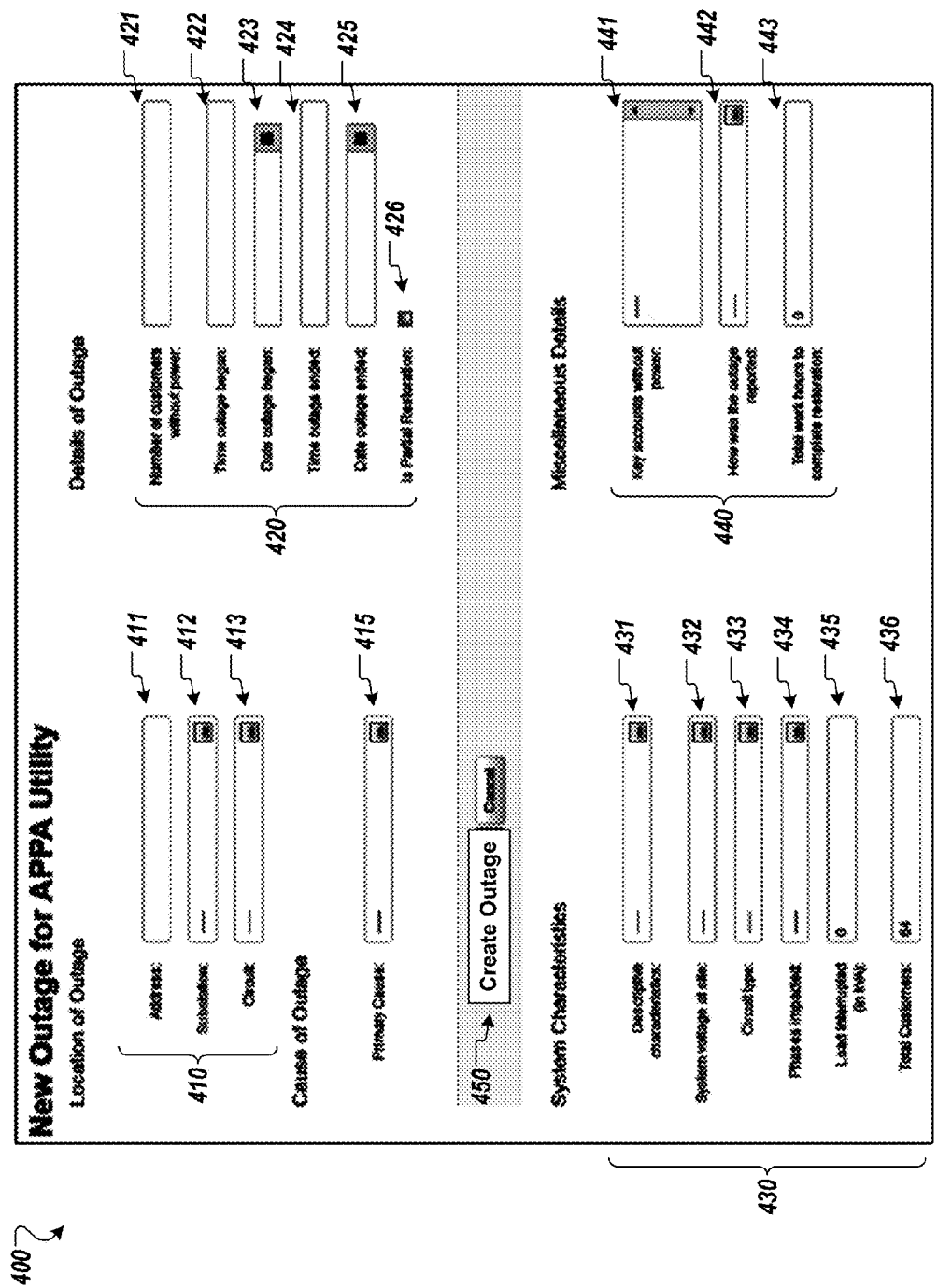
FIG. 4 is a diagram illustrating an example of a user interface for entering outage data.

FIG. 4 is a diagram illustrating an example of a user interface 400 for entering outage data. The user interface 400 allows a user to create a record for a new outage and send the information to the tracking system 110. In some instances, the user may be a utility worker, in an office or out in the field, that reports a service outage. The computing system 110 of FIG. 1 may provide the user interface 400 to one of the client devices as a web page or other resource. Information entered at the user interface 400 may be transmitted to the computing system 110 for processing and storage.

The user interface 400 includes various controls 410 for inputting the location of an outage, such as an input field for an address 411. The controls 410 can also include drop-down boxes that allow a user to select a substation 412 and a circuit 413 to specify the location.

The user interface 400 allows the user to input the cause of the outage 415, for example, by selecting the cause from a predetermined list, such as with drop-down list 415, or entering text. Causes of outages may include, for example, actions by the public (e.g., vandalism, human accident, vehicle accident, contact with an object, non-utility fire, or non-utility excavation), natural causes (e.g., lightning, wildlife, etc.), weather conditions (e.g., storm, ice, heat, wind, etc.), vegetation (e.g., trees, vines, etc.), equipment failures (e.g., electrical failure, wear, damage, manufacturing defect, etc.), power supply issues (e.g., overload, loss of generating unit, or failure of greater transmission, etc.), utility human error (e.g., construction, maintenance, operations, etc.), scheduled interruptions (e.g., commercial construction, residential construction, road construction, etc.), non-customer requests (e.g., by the police department or fire department), customer activities (e.g., non-payment, relocation, repairs, etc.), utility maintenance or repairs (e.g., load swap, equipment maintenance, etc.) In some implementations, users may input the general category for the cause, such as "natural causes," and in some implementations users may alternatively enter a more specific cause, such as, "wildlife" or "squirrel." More specific cause entries retain the more general cause tree information. For example cause "squirrel" contains in it the more general cause information "unscheduled" as well as the slightly more detailed cause information "wildlife". Various causes of outages are shown in FIG. 12.

The user interface 400 also includes controls 420 that allow a user to input details about the outage. For example, the controls 420 can include input fields to receive a number of customers 421 without service, a time 422 and time 423 the outage began, and a time 424 and date 425 the outage ended. The user can also indicate, for example, whether the end of the outage is a partial restoration of service 426, which indicates that the recorded outage is one of several related to a larger restoration event and whether to treat that event as relating to a single cause or multiple causes The user interface 400 includes controls 430 for entering system characteristics of the area of the system affected by the outage. Drop-down lists, text input fields, or other controls can be provided to receive information about, for example, descriptive characteristics 431 (e.g., whether power delivery is overhead or underground), system voltage at the site 432, a circuit type 433 (e.g., radial, primary loop, primary selective, secondary selective, spot network, etc.), the number and phase of electrical wires impacted 434, an amount of load interrupted 435 (e.g., in kilovolt-amps (KVA)), and a total number of customers affected 436.

The user interface 400 may also include controls 440 that permit the user to enter other details, such as key accounts without service 441, how the outage was reported to the service provider 442, and a total number of work hours needed to complete restoration of service 443.

When the user or machine has entered the applicable information about the outage and the affected system, the user can submit the information to the tracking system 110, for example, by clicking a button 450 or otherwise interacting with the user interface 400. The information entered about the outage is stored by the tracking system 110, and can be used to provide reports and other information, as well as to generate classifications, recommendations, and predictions.

Figure 5A:
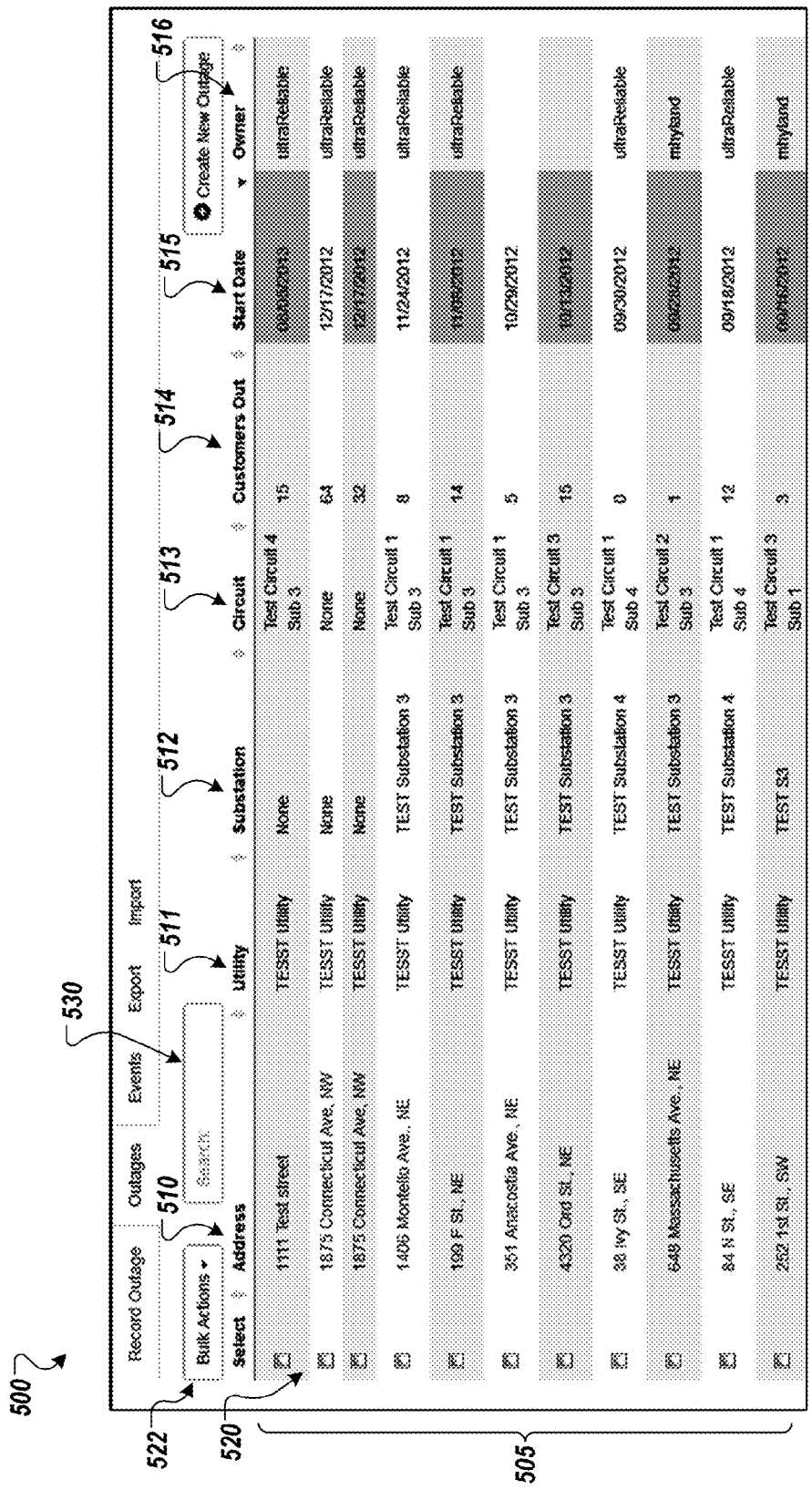
FIG. 5A is a diagram illustrating an example of a user interface for providing information about outages.

FIG. 5A is a diagram illustrating an example of a user interface 500 for providing information about outages. The user interface 500 provides a list of outages 505 associated with a service provider, as well as information about the outages in the list 505. In the example, a list of several outages is shown, with each outage corresponding to a different outage record entered as shown in FIG. 4. The user interface 500 indicates an address 510, an indication of the service provider or utility 511, the substation 512 and circuit 513 involved, a number of customers 514 affected by the outage, the start date 515 of the outage, and an owner for the outage record (e.g., user or organization that entered the outage or has control or responsibility for the outage).

The user interface 500 also includes controls 520 that permit the user to select one or more outage records, and a control 522 to initiate an action for the selected outage records. For example, a user may select multiple outage records and delete the selected outages, or group the selected outages as part of a single event. The user may also search among the outages by entering a query in a query input field 530.

In some implementations, a user interface is provided that indicates events, where each event represents one or more individual outage records. The events or groups of outages may be viewed, searched, and managed in the same manner as individual outages.

Figure 5B:
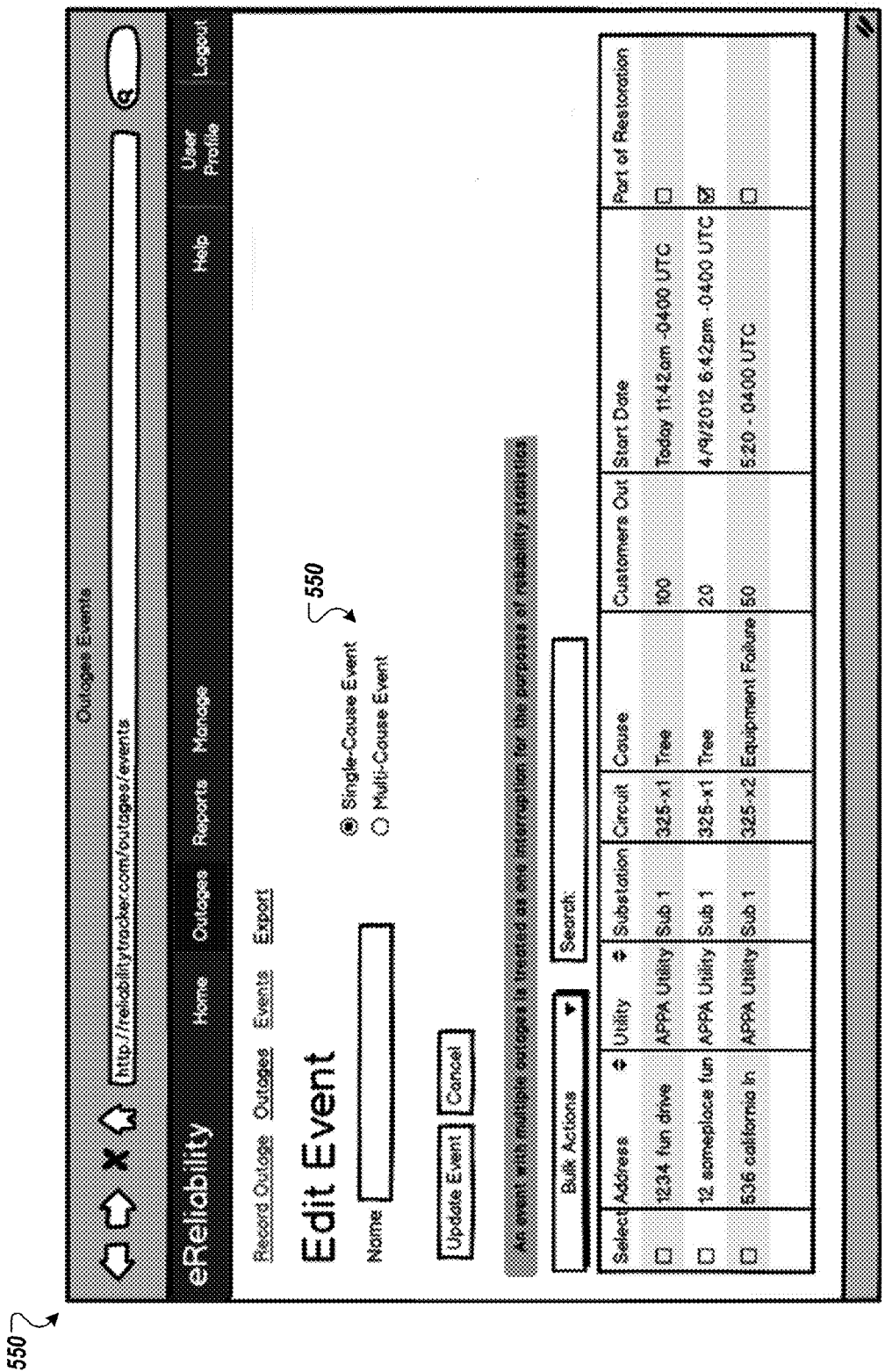
FIG. 5B is a diagram illustrating an example of a user interface for editing an outage event.

FIG. 5B is a diagram illustrating an example of a user interface 550 for editing an outage event. The user interface 550 includes options 555 allowing a user to specify whether an event has multiple causes or single cause. In some instances, the "multi-cause" option is selected by default, so that all outage causes associated with the event will be included in any analysis that the tracking system 110 performs. For example, a single outage could be classified as being caused by a tree and also by lightning, and so the count of outages caused by trees and the count of outages caused by lightning would both be incremented based on this single outage event. If the "single-cause" option is selected, the tracking system 110 will only use the first-listed cause in analysis, e.g., so that each outage event increments only one outage count.

Figure 6:
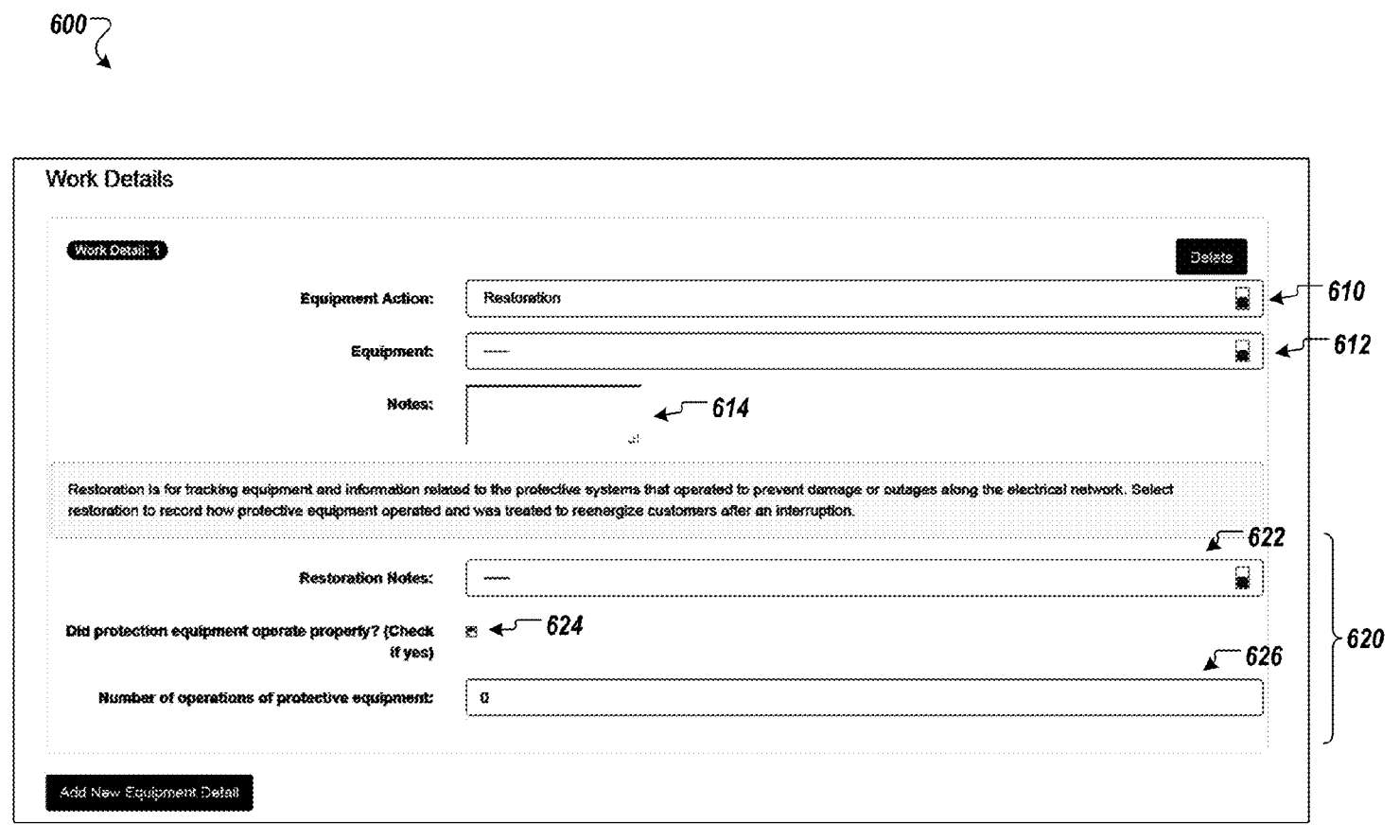

FIG. 6 is a diagram illustrating an example of a user interface 600 for entering equipment and service information. The user can use the user interface 600 to enter information about equipment or other custom variables as defined by the user, such as repairs, replacements, and restoration of service. Information about equipment may be associated with individual outages or groups of outages.

The user interface 600 includes a control 610, such as a drop-down box, that permits the user to indicate a type of equipment action to be recorded by the system. Examples of actions include repair, replacement, testing, failure, or restoration. The user interface 600 includes another control 612 that permits the user to indicate which equipment is involved. The list of equipment that is tracked may be customized by a user or utility. For example, one utility may decide to track the failure and replacement of fuses, and another utility may not. The user interface 600 includes an input field 614 in which a user can enter notes about the equipment and the action being recorded.

When a user selects an equipment action, additional controls 620 corresponding to the selected action may be provided. For example, for a restoration action, a note control 622 permits the user to enter additional notes, a status control 624 allows the user to indicate whether protection equipment operated correctly, and an input field 626 permits the user to indicate a number of operations of protective equipment that have occurred.

When the user or machine has finished entering information about the equipment action, the user can use a control 630 to cause the tracking system 110 to record the information. Information about equipment can be used to track the performance of equipment and make estimates for future repair or replacement needs. In some implementations, the equipment information can be used to recommend maintenance schedules or inventories. The tracking system 110 may use monthly or seasonal trends to indicate, for example, the amount of replacement fuses or other equipment that is typically needed for a given month or season, allowing the utility to stock equipment appropriately. The information may also be used to assess quality of components and estimate the frequency of future repair needs. For example, the tracking system 110 may analyze the equipment action history for a utility and identify that types of equipment that have failed at a higher than expected rate (e.g., more often than other comparable equipment).

In some implementations, the tracking system 110 may correlate records of equipment actions to identify equipment actions corresponding to similar outages or outages with similar restoration characteristics. The tracking system 110 may also correlate equipment actions with weather data or other information. For example, the tracking system 110 may estimate the likely equipment needs following a forecasted storm based on characteristics of previous storms and the repair, replacement, and restoration actions that followed those storms. As discussed further below, equipment information and other information for a single utility or multiple utilities/service providers may be used with a statistical analysis and machine learning module to generate predictions and recommendations.

Figure 7A:
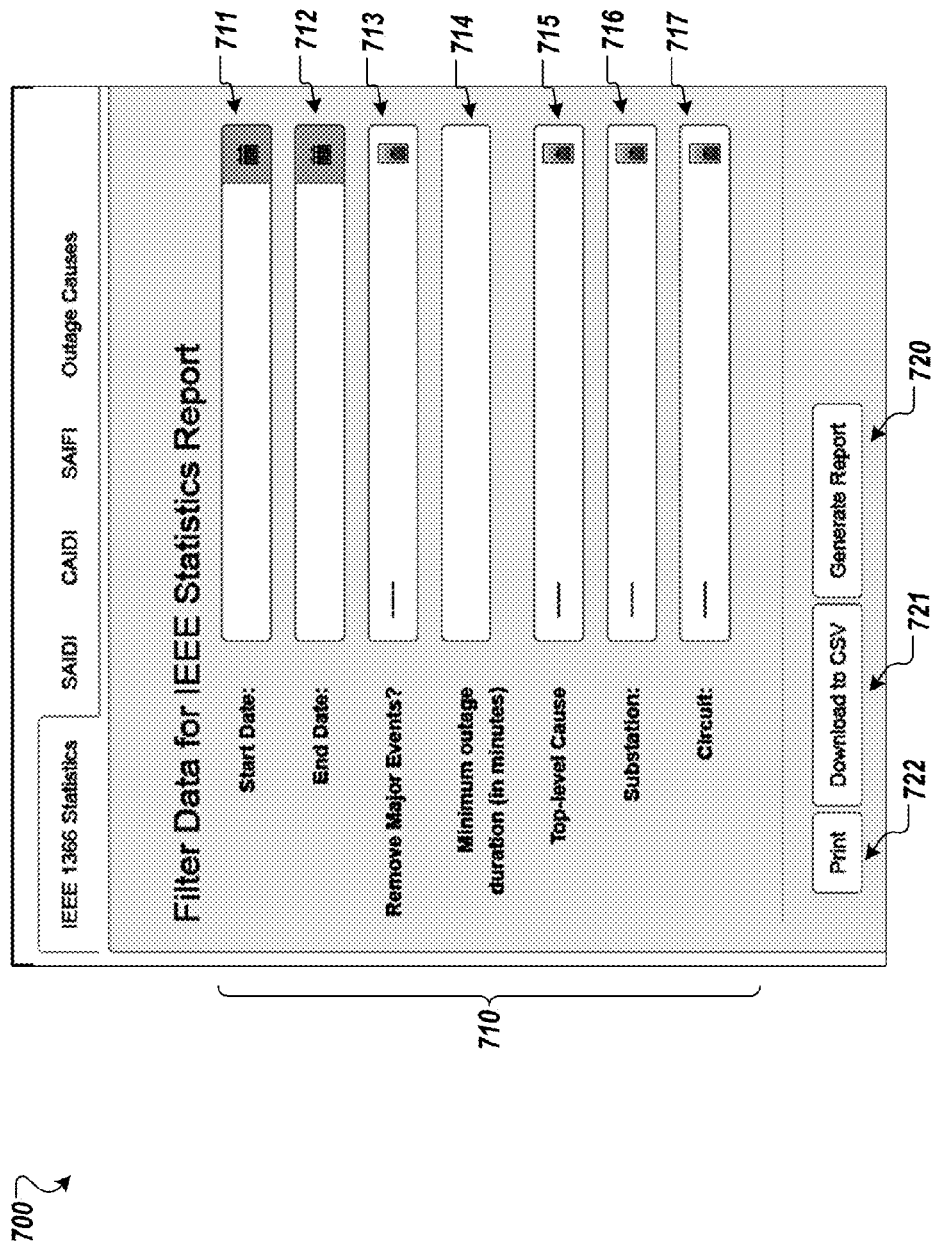

FIG. 7A is a diagram illustrating an example of a user interface 700 for filtering data and requesting a report. The user can use the user interface 700 to enter query parameters and request a report according to the specified parameters.

The user interface 700 allows the user to select from various different types of reports. Some of the reports that may be generated include a report of IEEE 1366 statistics, a Customer Average Interruption Duration Index (CAIDI) report, a System Average Interruption Duration Index (SAIDI) report, a System Average Interruption Frequency Index (SAIFI) report, or a report of outage causes. Other possible reports include analysis of outage causes by interruptions and duration. For some users reporting on multiple utilities/service providers may occur.

After selecting the desired type of report, the user may use filter controls 710 to specify the set of outage data to be used in generating the report. In some implementations, reports are generated based on data regarding only outages in the service provider's region of service. For example, the reports shown to an electric utility may reflect only outages for customers of that particular utility.

When requesting a report, the user can filter the data used to generate the report, for example, outages in a particular time range or outages with particular characteristics. The controls 710 allow the user to indicate a start date 711 and an end date 712, so only outages occurring between the start date and end date will be considered in generating the report. The controls 710 also allow the user to indicate whether to exclude major events based on one or more statistical methods 713, such as unusual or extraordinary outages that are uncharacteristic for the utility. The user can also set a minimum outage duration 714, so that very brief outages can be excluded. The user can also limit the outages used to generate the report to outages having a particular outage cause 715 (e.g., weather, wildlife, equipment failure, etc.). The controls 710 also allow the user to specify a location or portion of infrastructure, for example, by specifying a substation 716 and/or circuit 717 that the report should describe. In some implementations, the user interface 700 may allow the user to input locations in other ways, for example, by indicating a county, city, zip code, address, or other region.

After the parameters for the report have been entered, the user can interact with a button 720 or other control to generate a report. In response, the tracking system 110 identifies the data relevant to the parameters that the user has specified, generates the report, and provides the report to the user's device. The user may alternatively interact with other controls 721, 722 to download or print the report or the subset of data used to generate the report.

Figure 7B:
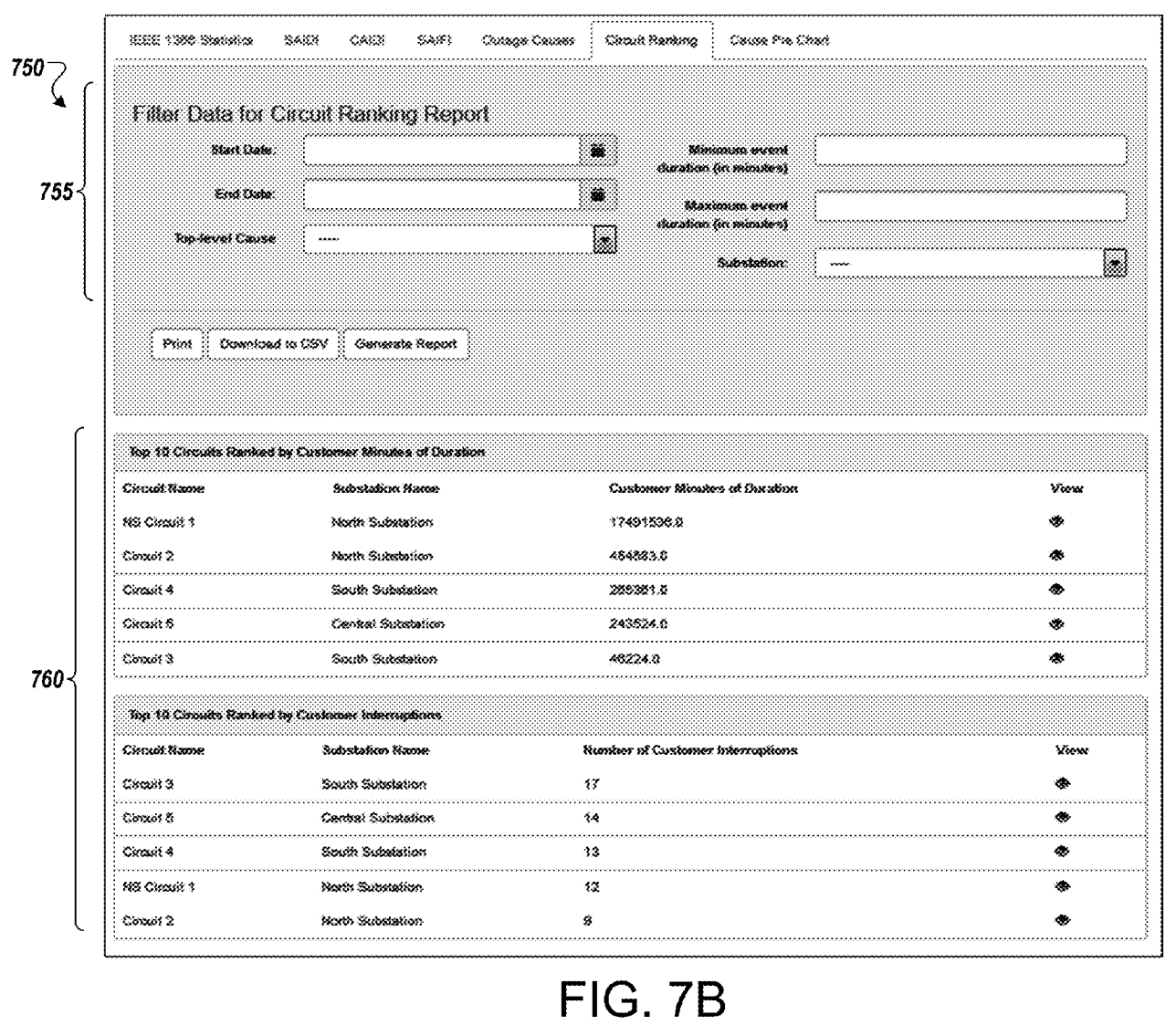

FIG. 7B is another example of a user interface 750 for filtering data and requesting a report. The user interface 750 includes controls 750 that allow a user to specify various parameters for filtering, such as a start date, end date, top-level cause or other cause of an outage, a minimum event duration, a maximum event duration, and a substation involved. The user interface 750 also provides results 760, which may rank various locations or equipment according to one or more criteria. The results 760 may show results that meet the criteria the user has specified. In the example shown, since filter criteria have not been entered, the results 760 are selected from an overall set of data about a utility. The results 760 include a list of circuits ranked by duration of service, e.g., total service or continuous service, as well as a list of circuits ranked by number of customer interruptions.

Figures 8A, 8B:
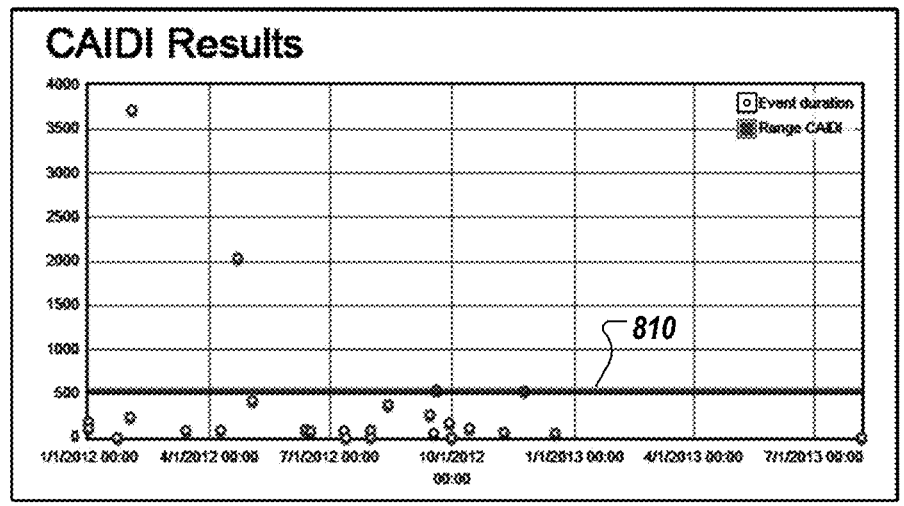

FIGS. 8A-8E are diagrams illustrating examples of user interfaces 800, 850 for reports regarding outages. In the example of FIG. 8A, the user interface 800 provides a chart that indicates various outage events according to the date and severity of the event (e.g., duration of the outage). The user interface also indicates a Customer Average Interruption Duration Index (CAIDI) value 810 to assist the user in evaluating the data.

In the example of FIG. 8B, the user interface 820 includes various reliability statistics, including an Average Service Availability Index (ASAI) value 821, a CAIDI value 822, a System Average Interruption Duration Index (SAIDI) value 823, and a System Average Interruption Frequency Index (SAIFI) value 824.

Figure 8C:
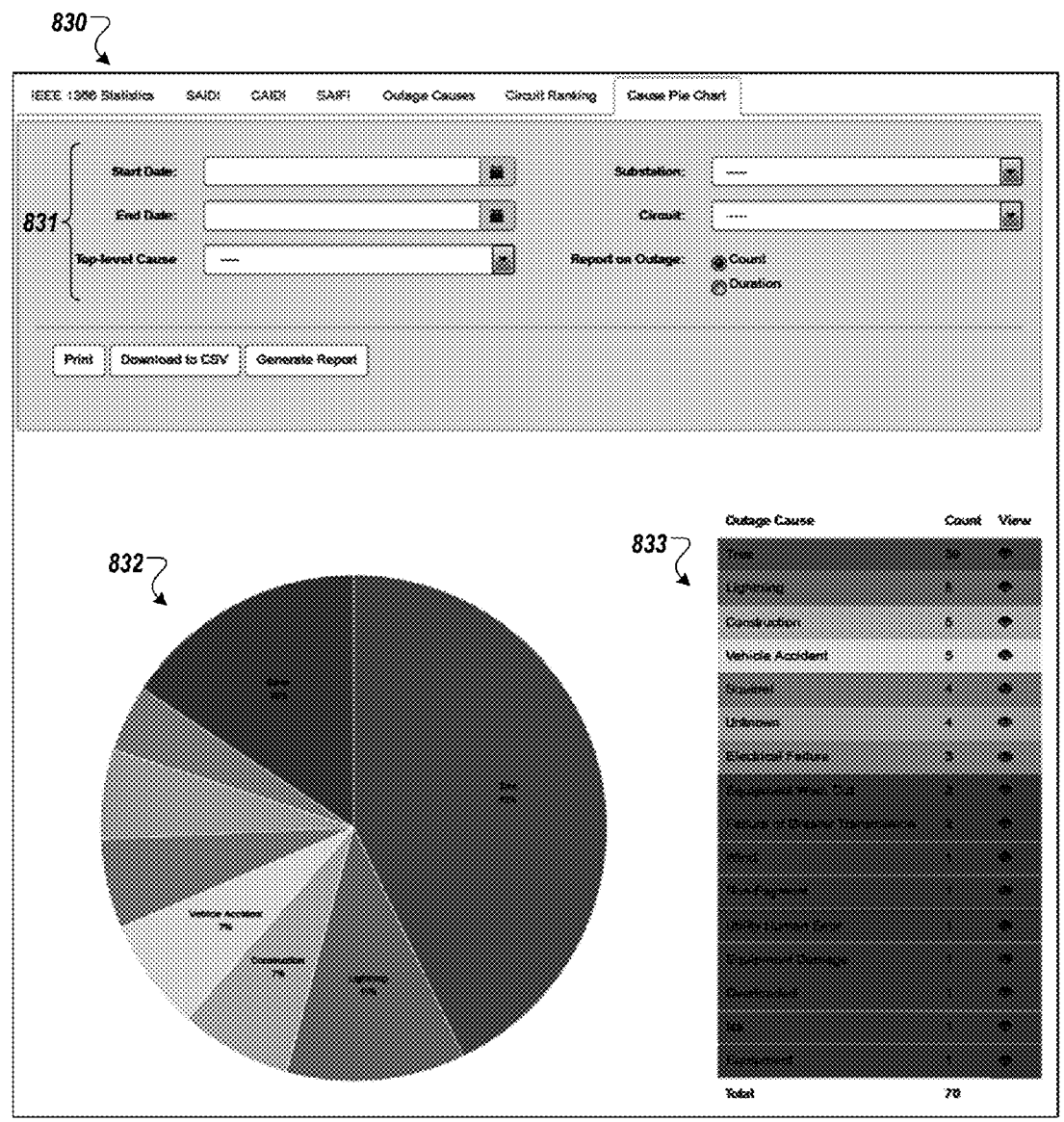

In the example of FIG. 8C, a user interface 830 includes a set of filter controls 831 allow a user to select a relevant data set, and information about the selected data is shown below, for example, in a pie chart 832 or a ranked list 833. In the example, the chart 832 and the list 833 provide visualizations of the breakdown of outage causes that affect a particular utility. The user may select a particular cause by interacting with a portion of the chart 832 or with an item in the list 833 to view additional information about the outages considered attributed to that particular cause.

Figure 8D:
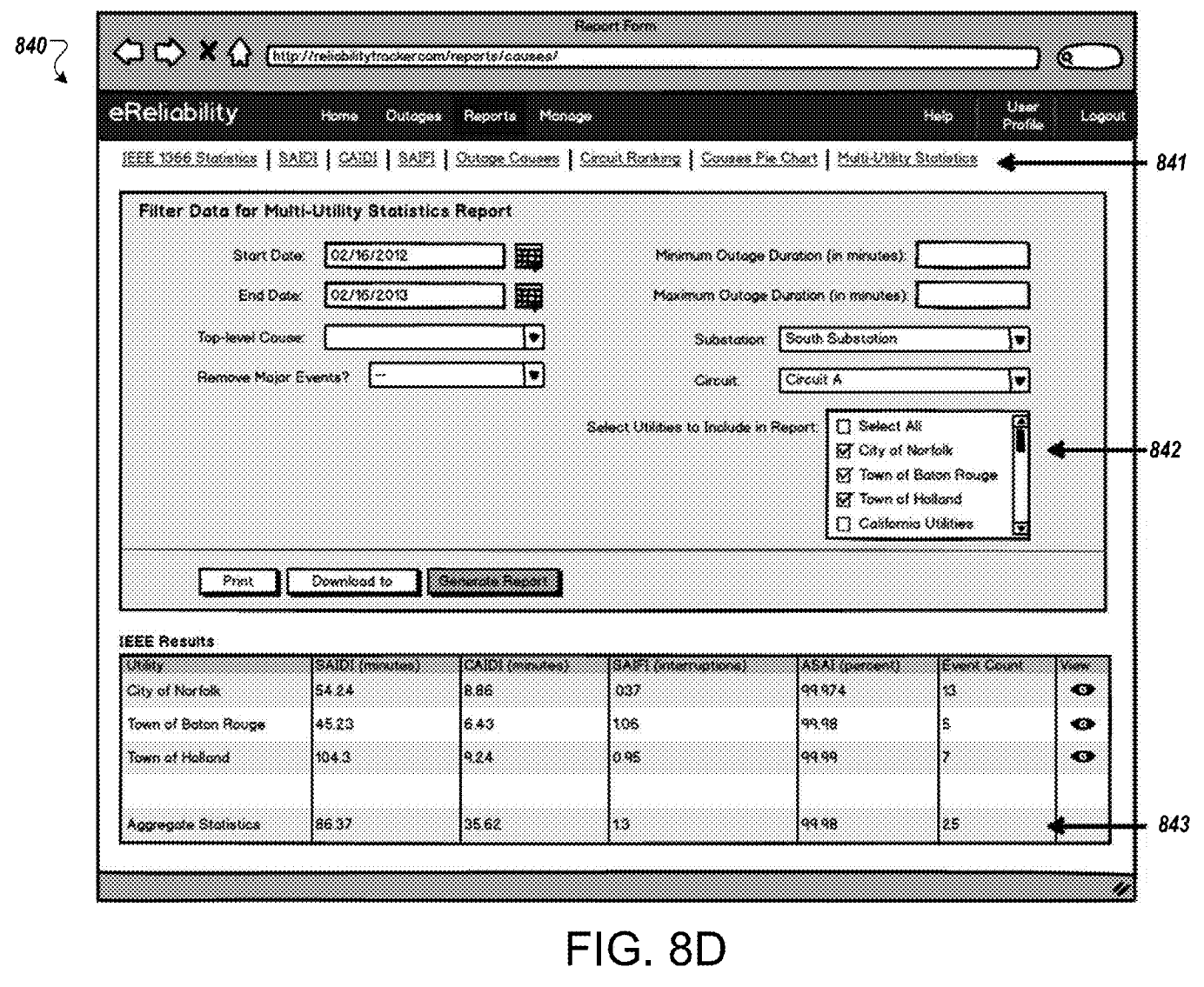

In the example of FIG. 8D, a user interface 840 allows users to access reports regarding multiple different service providers. For example, if a user is authorized to access information about multiple utilities, a control 841 allowing the user to access multi-utility statistics is displayed. The control 841 is not provided to users who are authorized to access data for only a single utility. The user interface 840 also includes a control 842 permitting the user to select a set of utilities to include in an analysis. The control 842 may indicate or list only the utilities for which the user is permitted to access data. The tracking system 110 then generates various analysis results based on the user's selections. For example, the system can include results for each selected utility individually, as well as overall results for the selected set of utilities in the aggregate. For example, the analysis results in line 843 are based on the aggregated data from multiple utilities, as if the events were all associated with a single utility. For example, to calculate SAIDI metrics for the set of utilities, the system may sum the durations for all events for the three selected utilities, and divide by the sum of the number of customers for the three utilities.

Figure 8E:
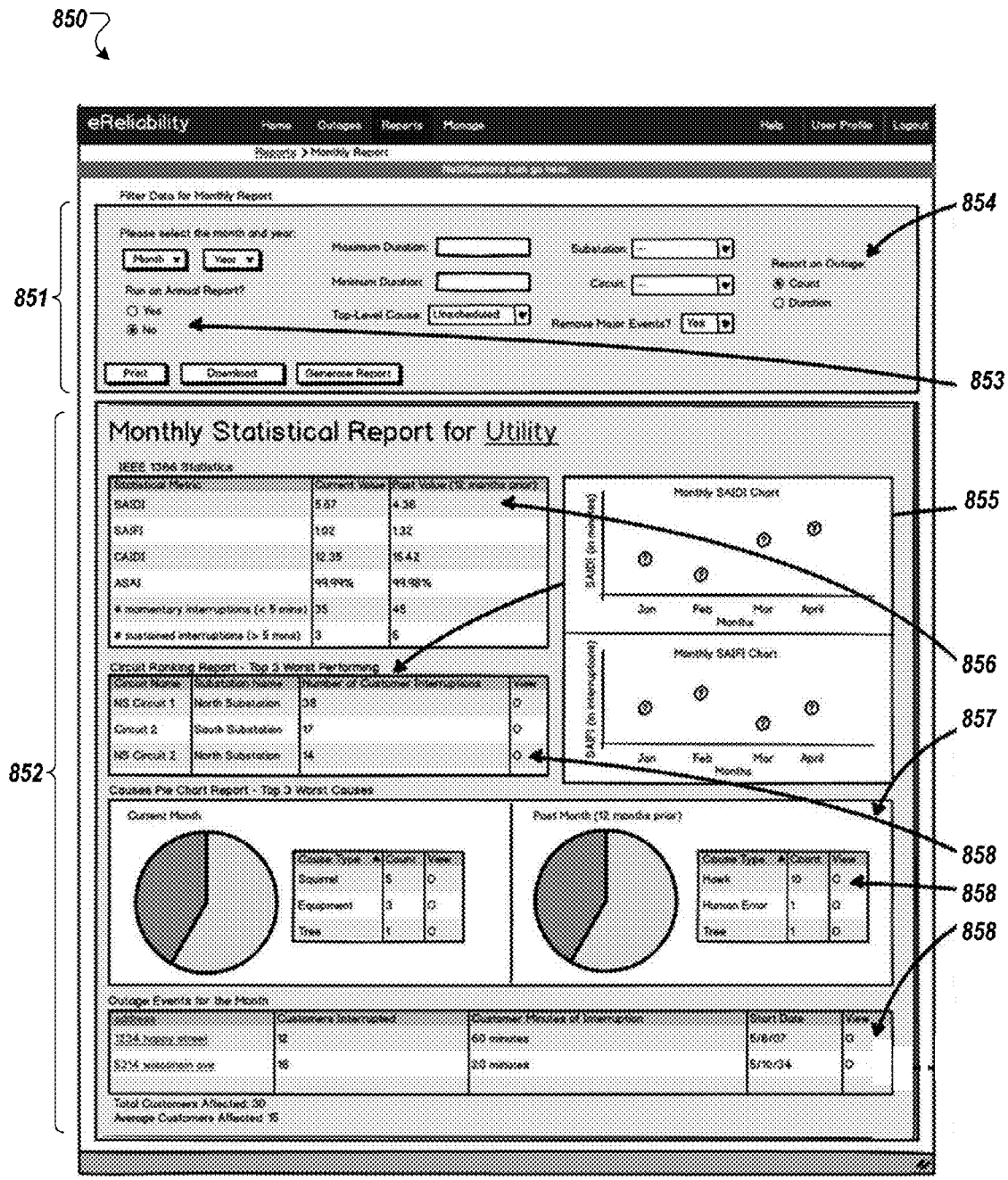

In the example of FIG. 8E, a user interface 850 shows an example of a monthly report, e.g., a report of a service provider's performance or statistics for the prior month. Similar reports may be provided for any time period, e.g., a previous month, a specified quarter, the past year or a prior year, etc. The user interface 850 is interactive and includes controls 851 that allow the user to define parameters of the data set to be included in the statistics 852 shown below. For example, the user may select a control 853 to indicate whether the report should cover the performance of the service provider over the last 12 months. For example, a control 854 permits a user to select whether to toggle between showing charts and rankings in terms of outage counts or outage durations. For example, the user can select whether a circuit listing should rank circuits by count of outages or duration of outages, and similarly whether a pie chart indicating causes of outages should be based on the counts of outages for each cause or the durations of outages for each cause.

The statistics 852 can include a list 855 of the worst performing circuits, for example, a predefined number of the worst-performing circuits according to a metric, such as number of customer interruptions. The statistics 852 can include a table 856 that compares various metrics for the current analysis period, e.g., the prior month, with corresponding metrics for the prior period, e.g., the month before the prior month. A similar comparison 857 may be shown with charts, graphs, and tables to show data for one period relative to data from another period. Throughout the interface 850, controls 858 can be placed to permit the user to request more detailed information, for example, about a particular circuit or location, a particular outage cause, or a particular outage event.

In some implementations, information may be provided and received over an application programming interface (API) or other machine interface, in addition to or instead of through user interfaces for human users. For example, automated systems may detect service outages and record the outages with the tracking system 110 without any human interaction with the system. Any of the information provided or received through the user interfaces shown in FIGS. 4-8E and discussed herein may be provided or received through machine interfaces.

Figure 9:
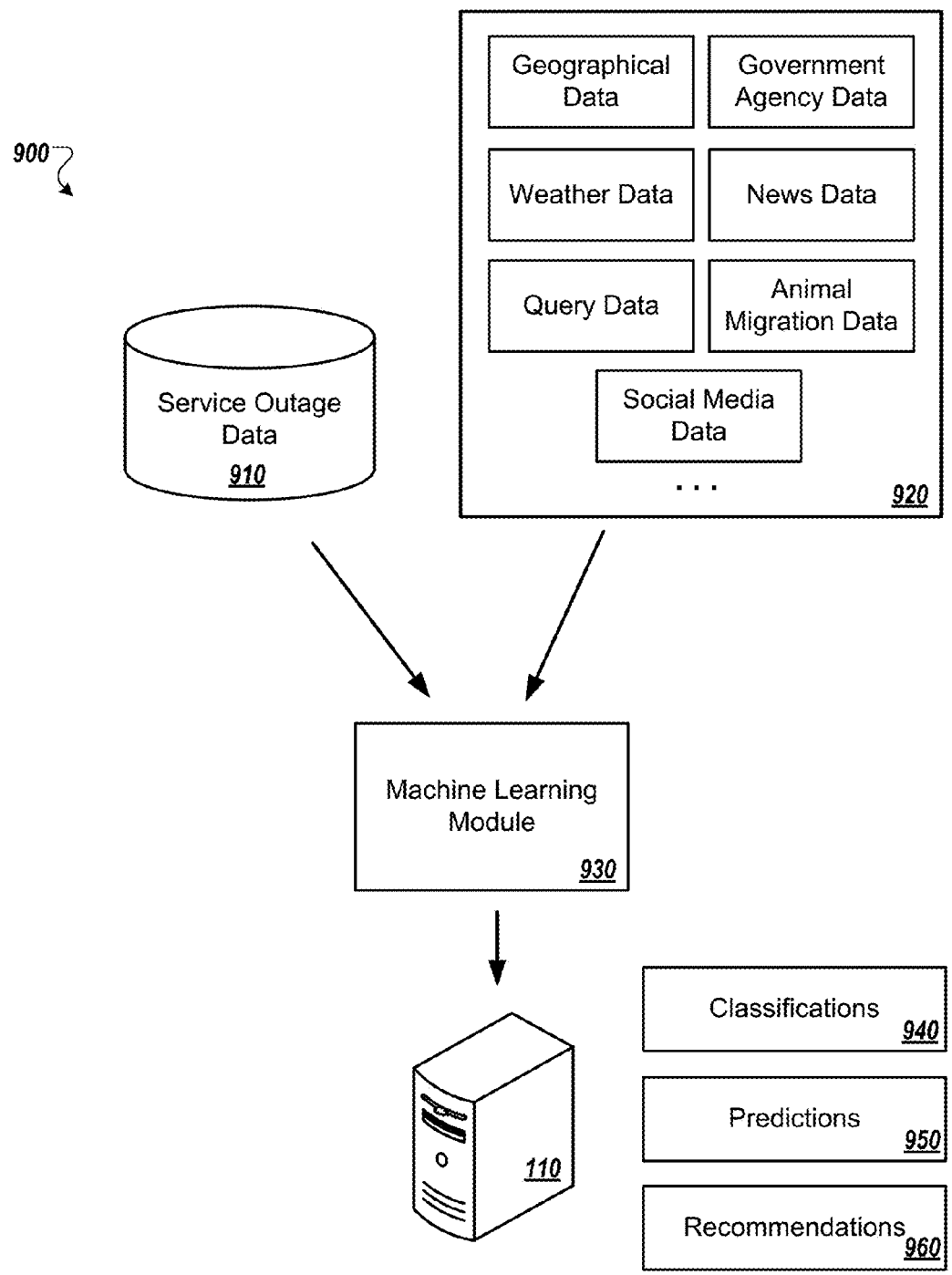
FIG. 9 is a diagram illustrating use of machine learning to analyze service outages.

FIG. 9 is a diagram illustrating a system 900 for using machine learning to analyze service outages. The tracking system 110 can use various machine learning techniques to generate insights from the outage data. Examples of machine learning techniques that may be used include classifiers, decision trees, clustering algorithms, and neural networks.

In some implementations, machine learning techniques can be used to classify utilities and service regions. For example, machine learning algorithms may discover outage cause/duration thresholds and resiliency boundaries. As another example, systems with similar resistance to similar outage causes can be grouped despite their geographical or operational dissimilarities. Clustering algorithms can be used to identify patterns in the data and find utilities that have similar characteristics. In some implementations, a machine learning module can be trained to predict effects of storms and other events and to provide recommendations.

The system 900 includes the tracking system 110 and a machine learning module 930. Using service outage data 910 and additional information 920, the tracking system 110 can train the machine learning module 930 to predict outcomes based on a set of input conditions. The outage data 910 can be used as training data for training the machine learning module 930. The outage data 910 provides many examples of the characteristics of outages and the conditions at the time of the outages. Certain types of information from the outage records can be designated as desired outputs of the machine learning module 930, and other outage data, and additional context from the additional data 920, may be used as the inputs.

For example, the output of the machine learning module 930 can be values that represent effects of storms, such as the number of customers that lose power, the duration of outages, the locations of outages, and so on. The machine learning module 930 may be configured to accept input various parameters that indicate weather characteristics (e.g., wind speed, direction, precipitation amount, temperature, etc.), infrastructure characteristics (e.g., system age, outage history, etc.), geospatial characteristics (e.g., latitude and longitude of outages and/or equipment) and other conditions. To train the machine learning module 930, the tracking system 110 inputs the weather, infrastructure, and other conditions corresponding to previous outage, and uses the actual outage characteristics, or a probability score or other measure of utility performance, as a target or "correct" output. The tracking system 110 adjusts the weights or other parameters of the machine learning module 930 so that the set of input produces the target output or an approximation of the target output for each utility or service provider then across entities. The tracking system 110 repeats the adjustment process with different historical outages so that the machine learning module 930 is exposed to many different sets of input conditions and the actual results corresponding to those conditions. Training can be continued until the outputs of the machine learning module 930 are within a desired range of the target outputs.

In some implementations, training is performed using a supervised learning procedure may be used where the actual outage characteristics represent a label associated with the set of input. The labels or target outputs may represent, for example, a state or condition of a particular piece of equipment, geographic location, or utility system. Alternatively, the target output may represent a probability, such as a probability of an outage having a particular cause, or a more general value representing a characteristic of a portion of a utility system or a utility system as a whole.

After training is complete, the tracking system 110 can use the machine learning module 930 to predict outcomes or generate recommendations for new conditions. For example, the tracking system 110 can provide weather data and current system characteristics to the trained machine learning module 930, and receive outputs that indicate predicted effects of storms, or recommended actions for dealing with the storms. The tracking system 110 may provide these predictions or recommendations to the utilities that may be affected by storms or other events.

In some implementations, the tracking system 110 can predict the intensity and cause of service outages in response to impending weather events. To make these predictions, the tracking system 110 can use, for example, outage data for specific utilities, aggregated outage data for multiple utilities, location data, and weather data.

For example, a user may desire information about the effects of an impending storm on a particular utility. The tracking system 110 can request and receive weather data that indicates the characteristics of the storm, such as current or forecasted information about precipitation, wind intensity, wind direction, and temperature. The tracking system 110 also accesses stored utility data about the utility of interest, such as historic performance of the utility in storms similar to the type indicated in the weather data. The tracking system also accesses aggregated data about how other similar utilities have performed during storms of the same type. In some implementations, the tracking system 110 may apply weights to the data to emphasize certain factors. For example, it may be determined that wind intensity is more correlated to outages than wind direction, and so a higher weight may be applied to wind intensity than to wind direction.

From this information the tracking system 110 may estimate or predict the impact of the storm on the particular utility. For example, the number of customers affected, the locations affected, and the duration of outages may be predicted. To generate predictions, the tracking system 110 may identify patterns in the data, and provide estimates based on those patterns. For example, if storms of the same precipitation historically caused 2,000 customers to lose power, on average, the tracking system may predict that the current storm will cause 2,000 customers to lose power.

As another example, the tracking system 110 may input weather data and utility data to a machine learning system that has been trained to predict the effects of storms. The machine learning module 930 may be trained using aggregated data for multiple utilities and/or historical data for the particular utility of interest. In response to input indicating storm characteristics, the machine learning module 930 may output values indicating estimated effects of the storm.

In some implementations, the tracking system 110 generates an expected response rating based on severity of storm, utility historical performance, and historical performance of similar utilities. The tracking system 110 may suggest resiliency improvements based on the characterization of storms and outages caused. For example, the tracking system 110 may suggest preventative measures for dealing with a storm, such as requesting additional staff, crews from neighboring utilities, or contract crews to be ready to deal with predicted outages.

The tracking system 110 may generate maps that indicate estimates of outages and damage types for the utility's territory. As an example, the tracking system 110 may provide a predicted outage intensity map with an epicenter(s), which may allow the utility to place linetrucks and other pre-storm response items. As another example, a map may indicate estimates of equipment damage, such as a number of utility poles that are likely to be damaged in various areas.

Figure 10:
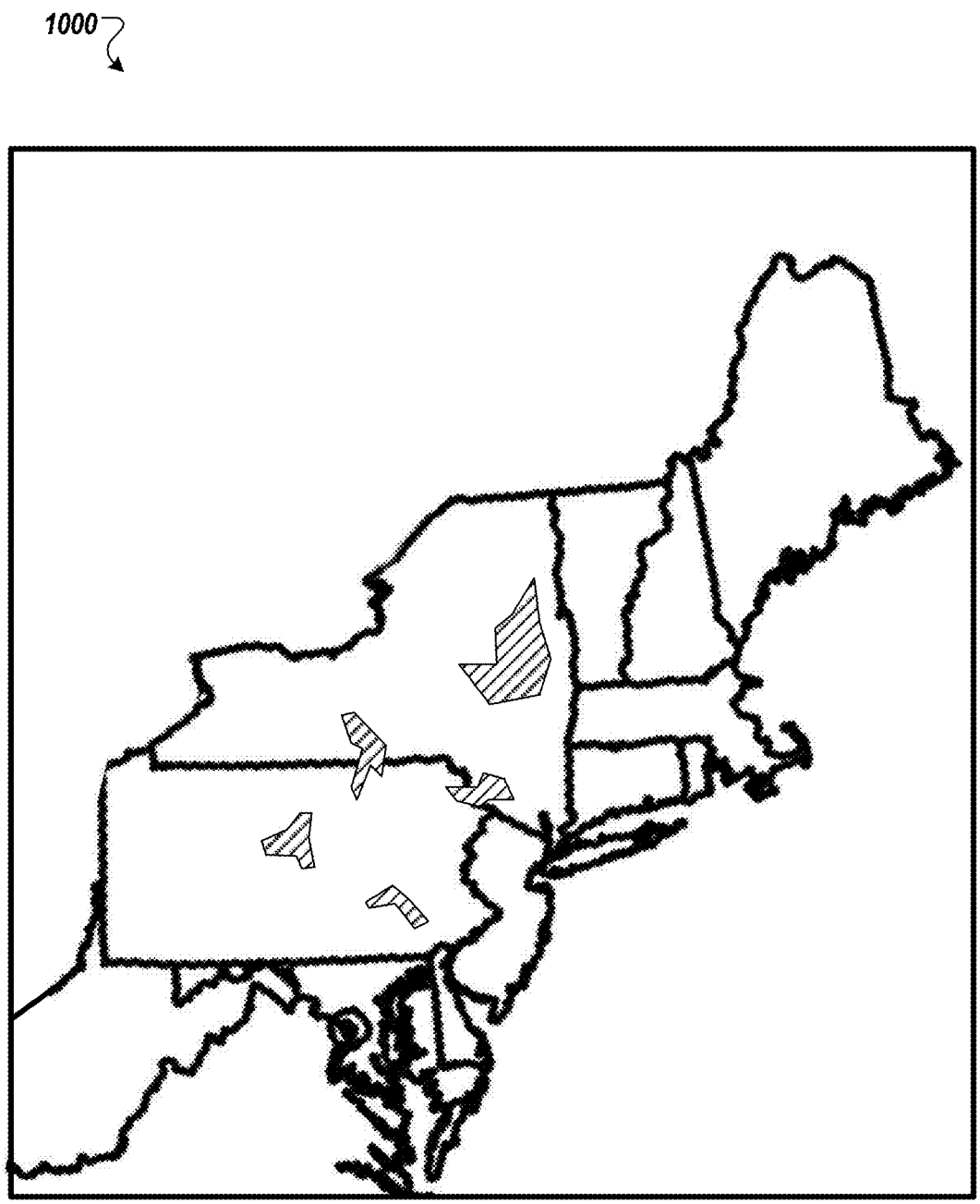
FIG. 10 is a diagram illustrating an example of a user interface including a map.

FIG. 10 is a diagram illustrating an example of a user interface 1000 including a map. In the example, shaded regions of the map represent areas that the tracking system predicts will experience outages due to a forecasted storm. The tracking system 110 may provide maps that indicate other information, such as areas of recommended preventative maintenance, areas having similar reliability measures, areas of similar vegetation or terrain, and so on. Maps may be provided at various different scales, for example, by state, by county, by city, by neighborhood, or at a street-level view.

Referring again to FIG. 9, the tracking system 110 may use customer service usage data and Internet search data to provide insight into customer anxiety regarding storm and suggests pre-storm communications. For example, the tracking system can examine search query logs to determine how frequently customers in a service area have searched for weather or utility related terms, such as "storm," "power outage," "severe weather," and so on. The tracking system 110 may use social media posts in the same manner. In some implementations, the tracking system 110 can distinguish queries or social media posts initiated with a mobile device from those submitted with a desktop computer. Increasing mobile submissions that are storm related may indicate a higher level of customer anxiety.

After a storm has occurred, the tracking system 110 may use information about reported outages to suggest post-storm communications to customers. Or may allow users to post outage crisis data for use by other public service entities and the general public. For example, given the utility's prior responsiveness when facing similar outage scenarios, the tracking system 110 may suggest how soon service is likely to be restored for various regions that the utility services and provide more generalized data for use in communicating outage significance to the public.

In some implementations, the tracking system 110 may monitor weather forecasts and estimate the severity of storms or other large events. When the likelihood of an outage exceeds a threshold, the tracking system 110 may notify customers (e.g., individuals and businesses) of the storm and the possibility of an upcoming power outage. The tracking system 110 may also notify utilities that will potentially be affected by a forecasted or developing storm. The tracking system 110 may use storm weather data, storm location and path analysis, and regional energy market data to generate the predictions. In some instances, price increases or other changes in energy markets may reflect the severity or impact of weather or other events.

In some implementations, when a new service outage record is created, safety procedures are initiated to ensure compliance at a jobsite. The tracking system 110 may request tailboard data from field employees and communicates with management to keep them informed of procedures that are appropriate for the particular types of outages being addressed.

The tracking system 110 can examine pole, phase, or transformer outage times along with weather data for scheduled and unscheduled outages. Based on statistics for outages and emergent outage properties for the utility, the tracking system 110 may recommend training for employees or specific additional maintenance, such as vegetation care. The system may analyze aggregate performance data to estimate how a utility performs certain tasks in comparison to its peers. For example, if a particular type of repair takes an hour longer for one utility than for other utilities nearby, or similar utilities by other business metrics, the tracking system 110 may recommend training to improve the speed of that type of repair, or may recommend equipment that could speed the repair.

In some implementations, the tracking system 110 performs adaptive reporting that allows cross comparison of utility data and computed statistical metrics. In some instances, utilities use the IEEE 1366 "2.5 Beta" methodology to define a major outage event. However, the beta value of 2.5 may not be ideal for all utilities. The tracking system 110 can include an adaptive statistical analysis module that looks for a natural exclusion point for the 2.5 beta function. The analysis module finds minor deviations in the data that make more sense for each particular utility, based on the historical data for each utility, to create a new 2.0-3.0 beta function customized for an individual utility. This allows the utility to see its underlying outage reliability trend better over time.

The tracking system 110 may assign each utility an appropriate beta function. Utilities with similar beta functions may be categorized and clustered based on their assigned beta functions. Utilities with similar beta functions can be connected with notifications. The system allows users to find new insight into how they should evaluate the relative intensity of an outage on their particular system.

In some implementations, assigned beta functions can be used to define groups of similar utilities for purposes of predicting the effects of storms, as discussed above. Some utilities may be distant in location or size, yet may have other similarities that result in similar beta functions. As an example, utilities assigned beta values within a particular range (e.g., 2.0-2.2, or 2.2-2.4, or 2.4-2.6, etc.) can be grouped together.

In some implementations, major events defined using a utility's customized beta function may be analyzed by count and intensity. The geography and historical weather patterns for the service are can be retrieved, for example, from an independent source. The major event data and system data can be combined to generate a map of natural major event topography by region to help utilities better understand their "natural" major event threshold for their utility.

Utilities may also use major event statistics to evaluate why they have more or fewer major events than other utilities. The tracking system 110 may evaluate major event counts, geography data, and historical weather patterns to identify and highlight aspects that differ from averages or characteristics of various groups of utilities. This may give an indication of how comparable a utility's reliability statistics will be with the reliability data of other utilities.

The tracking system 110 may include a customer sensitivity module that suggests business and political prioritization of outage restoration. For example, the tracking system 110 may determine that there is a high priority to restore power to a hospital or fire station and to certain customers that provide a large source of revenue for the utility. The tracking system 110 may calculate a customer value for individual customers in the service area. The customer value may be estimated based on factors such as income tax and property tax data, census data, voting records, customer outage history, and/or electric usage patterns. The tracking system 110 may provide a list of important customers based on the estimated values, or a map indicating the regions where the estimated value of restoration to the customer is highest. This information may help a utility navigate the political and economic implications for restoration prioritization.

The tracking system 110 may be used to provide other recommendations to utilities. For example, using location information, outage data, and transmission loss data (e.g., from the Information Administration (EIA) or another source) the tracking system may estimate trends and norms for equipment sizing and circuit layout characteristics. The tracking system 110 may compare data for different utilities to help a utility assess its losses and outages relative to other utilities or groups of utilities.

The tracking system 110 may provide estimates of staffing needs or other human resources decisions based on weather patterns and outage patterns. The tracking system may use outage data (such as outage duration), the time of year, and weather forecasts to estimate staffing needs.

The tracking system 110 may use outage data, such as locations, causes, times, and particular substations affected, to provide predictive recommendations. For example, the tracking system 110 may recommend measures to deal with equipment issues like pole breaks, or to deal with animal migrations. Animal migrations can be mapped by season across various regions. For example, the effect of a "drey" of squirrels may be predicted by extrapolating seasonal squirrel migration movements to predict where clusters of squirrel related outages will next appear. Once appearance is predicted, preventative measures are suggested to utilities that may be affected. For example, the tracking system 110 may recommend the use of squirrel guards or covered wire.

The tracking system 110 may evaluate combinations of various outage parameters to suggest where certain maintenance actions should be performed. For example, based on outage length, outage location, outage causes, and circuit layouts, the tracking system 110 may suggest where conversion from overhead power lines to underground power lines would be most effective at preventing future outages. Similarly, the tracking system 110 may suggest locations where extensive tree trimming may be needed instead of spot trimming, or where bush planting or tree planting is best. For example, it may be recommended that a utility give away or recommend a certain type of tree to customers in order to reduce outages in an area.

The tracking system 110 may compare utility trends to national trends from Public Utility Commission data. The tracking system 110 may perform pattern matching between the data of various utilities to help utilities make benchmarking comparisons to other utilities with similar characteristics. Different utilities or infrastructure may be compared according to, for example, EIA form 861 energy loss data. As another example, utilities can be compared with other utilities with the same classification, as determined by assigned beta functions or by machine learning algorithms, as discussed above.

Figure 11:
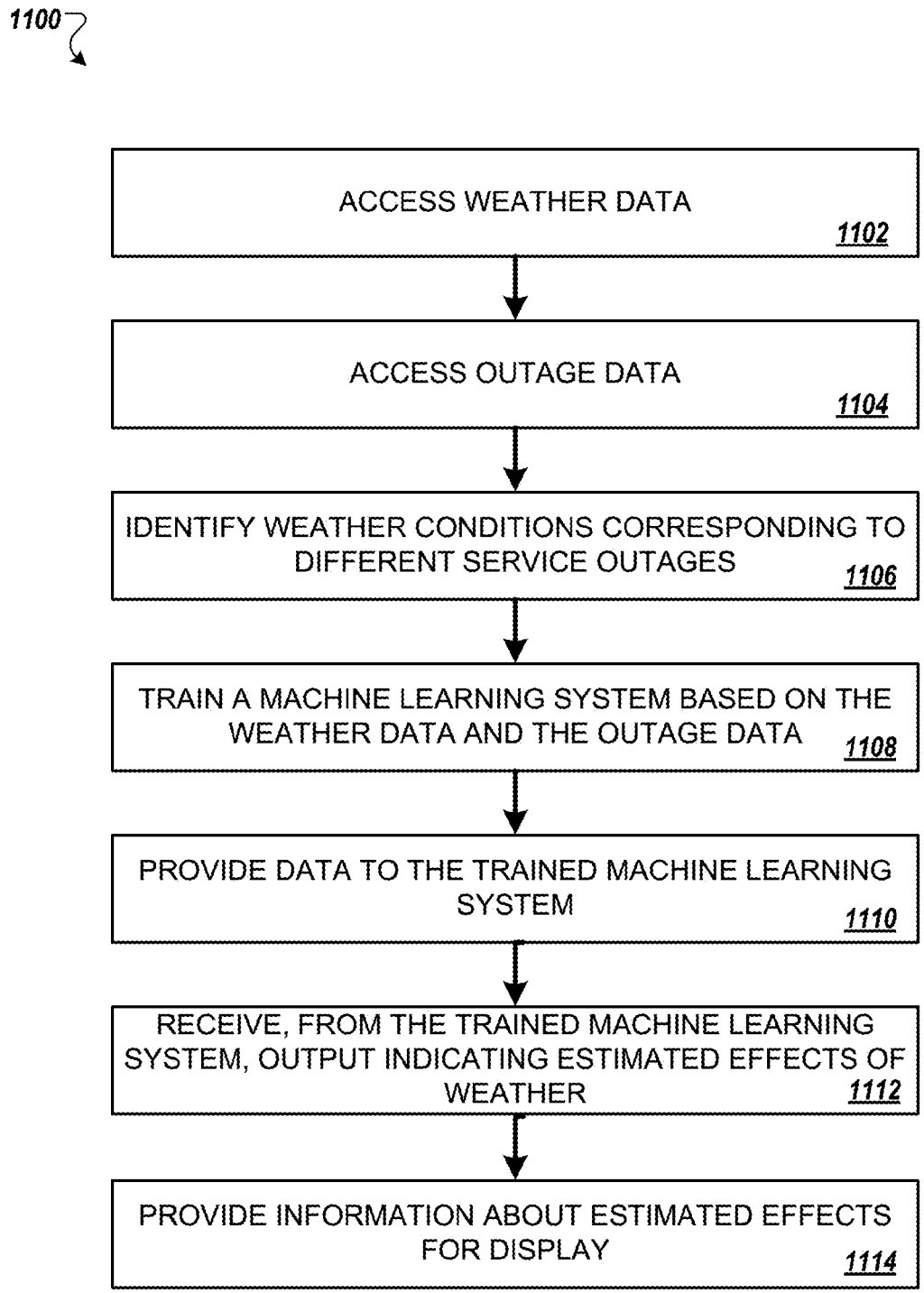
FIG. 11 is a flow diagram illustrating an example of a method for analyzing service outages.

FIG. 11 is a flow diagram illustrating an example of a method 1100 for analyzing service outages. The method 1100 may be performed by one or more computers, for example, the tracking system 110 discussed above in FIGS. 1 and 9. The example of FIG. 11 discusses analyzing correlations of weather conditions and service outages. The same techniques can be used to analyze any type or combination of conditions and potential effects on service providers and service outages. For example, in addition to or instead of analyzing weather conditions, the tracking system 110 may analyze traffic conditions, economic conditions, political conditions, social media trends, news and current events, or any other conditions or events. As discussed below, the correlations between service outages and various conditions can be used to train a machine learning system, and the output of the machine learning system can be used to generate estimates, predictions, recommendations, and other results. Similarly, while the example of FIG. 11 refers to utility systems and their outages, the same process may be used for service providers of any type, not only for utilities.

Weather data is accessed (1102). The weather data can indicate different weather conditions occurring in a geographic area over a range of time. For example, the weather data may indicate weather patterns occurring over a time period such as a day, a week, a month, a year, 5 years, 10 years, and so on. Weather data may be accessed from data storage or from one or more servers. The weather data can indicate conditions such as temperature, amount of precipitation, type of precipitation (e.g., rain, sleet, snow, hail, etc.), wind characteristics, lightning, water levels, solar activity, and barometric pressure.

Outage data is accessed (1104). The outage data can indicate service outages occurring in the geographic area over the range of time. The outage data can be data received by the tracking system 110 from multiple different utility systems. For each service outage, the outage data can indicate a corresponding time the outage occurred, a corresponding utility system, and a corresponding geographic location in the geographic area where the outage occurred. The geographic location may be provided in any of a variety of different forms, including, for example, geographic coordinates, such as Global Positioning System (GPS) coordinates, an address, a city, a state, a zip code, a substation identifier, a circuit identifier, or other location identifier.

The outage data may indicate other information about the service outages, such as an outage cause that is attributed to the outage, an outage type, and/or information about the severity of the outage, e.g., a duration that the outage continued, a cost or repair needed to restore service, or an amount of customers affected by the outage, or a geographic area affected by the outage.

Based on the weather data and the outage data, weather conditions corresponding to the different outages are identified (1106). For example, for each of the service outages, the tracking system 110 may identify one or more weather conditions that occurred at the corresponding geographic location of the service outage at the corresponding time of occurrence of the service outage. The identified weather conditions may indicate weather that occurred at the time the outage began or at a time slightly before the outage began, e.g., a predetermined period of 15 minutes, an hour, four hours, a day, or a week before the outage began. In some instances, weather occurring significantly before an outage can be identified, for example, one or more months before the outage occurred. This information can be correlated with outages to identify causes of outages that may be affected by weather and other events much earlier than the actual outage. For example, warm weather that comes unusually early in spring may result in increases in squirrel populations, which could result in greater numbers of squirrel-caused service outages in summer and fall. For example, warmer fall weather combined with a cold snap could lead to leaves being on the trees when the first ice hits and could result in longer duration outages than expected.

A machine learning system is trained using the weather data and the outage data (1108). For example, the machine learning system may be trained to estimate effects of weather conditions on utility systems using (i) the respective service outages and (ii) the identified weather conditions for the respective service outages. The estimated effects of weather conditions may include, for example, likelihoods of service outages at different geographic locations, estimated duration of service outages, areas affected by service outages, amounts of customers affected by service outages, and/or likelihoods that service outages may be of particular types or have particular causes.

Training can involve adjusting the parameters of the machine learning module 930 of FIG. 9 or another machine learning system to reflect probabilities of service outages according to the service outage events in the outage data. Individual service outages and their corresponding weather conditions can be used to train the system to estimate the effects of specific weather conditions for specific utilities and geographic areas. Training can include training a machine learning system that includes an artificial neural network, a support vector machine, a decision tree, a regression model, a maximum entropy classifier, a set of statistical models, or a model based on a genetic algorithm, or a model based on a clustering algorithm.

The machine learning system may be trained to produce any of a variety of outputs. In some implementations, the machine learning system is trained to output a probability of a service outage occurring in response to receiving input designating a set of weather conditions and data identifying a particular utility system or geographic location. The trained machine learning system may additionally or alternatively provide data by outage type and/or outage cause, for example, by indicating probabilities that outages of different outage types will occur and/or probabilities that different potential outage causes will affect a utility system or geographic location. Outages can have various different causes, as shown in FIG. 12, and outages can be categorized or classified in various ways. FIG. 12 shows examples of different classifications, starting with a general level, as indicated in the column "Cause level 1", as well as more specific sub-categories as shown in the columns for cause levels 2, 3, and 4. The machine learning system may be trained to generate outputs with respect to individual causes, for any of the individual items shown in FIG. 12, or for groups of multiple causes.

In some implementations, the machine learning system is trained to generate a system weather resiliency index that characterizes system state and potential vulnerabilities of a utility system. The system state can be a measure of relative robustness against disturbances, which may be affected by the construction type used at various parts of a power delivery network, and the utility system's aggregate ability to recover from different types of disturbances. For example, the system state may be an aggregate description of system health, such as an emergent property of all the construction, engineering, and cost decisions that have been made over time. The system weather resiliency index may be generated by outage type and outage cause. For example, the machine learning system may be able to generate, for each utility system, a corresponding resiliency index for each of multiple different outage types, or for each of multiple different outage causes, or for each possible combination of outage type and outage cause.

In some implementations, the machine learning system is trained to provide outputs that include a likelihood of occurrence of a service outage, an estimate of a duration of a service outage, an estimate of number of customers affected by a service outage, and/or an estimate of an area affected by a service outage.

Data for a particular utility system is provided to the trained machine learning system (1110). Depending on the training process used, different inputs may be provided. For example, the data may include an identifier of a utility system. The data may include one or more geographic locations corresponding to the utility system. The data may include data indicating characteristics of the utility system, such as system age, construction type, geography type, or other information about the physical characteristics of the utility system. The information may include a classification of the utility system, an identifier for a group of utility systems that includes the particular utility system, or a beta value determined for the utility system.

In response to providing the data for the particular utility system, output is received from the trained machine learning system (1112). For example, the output may indicate estimated effects of future weather conditions on the particular utility system. The output may indicate estimated effects, including probabilities of outages or other events.

The information that indicates the estimated effects of future weather conditions on the particular utility system is provided for display (1114). The information may be provided any of various forms, such as in a number, a table, a chart, a graph, or a map. The data may be provided locally at the tracking system 110 or remotely, for example, over a network to one or more client devices. In addition, recommendations can be made using the output of the machine learning system. For example, recommendations can be made for conducting maintenance, placing of equipment or crew, or budgeting to address potential service outages or other effects of weather. The recommendations may be determined, at least in part, based on output of the machine learning system, and/or information about utility systems different from the particular utility system.

In some implementations, the outage data indicates electric power outages of multiple different electric utility systems. The outage data may indicate, for each of the electric power outages, (i) an outage type selected from a set of multiple different outage types and (ii) a cause attributed to the electric power outage that is selected from a set of multiple different outage causes. The machine learning system can be trained to generate, given a set of weather conditions, outputs that include probabilities that electrical power outages will occur at different electric utility systems or different geographic locations in response to the set of weather conditions. The outputs of the machine learning system may indicate outage types, from the set of multiple outage types, and outage causes, from the set of multiple different outage causes, that are likely in response to the set of weather conditions. The multiple different outage causes comprise vandalism, accident, fire, excavation, lightning, wildlife, weather, vegetation, equipment failure, or any of the other outage causes discussed with respect to FIG. 4. The multiple different outage types include a pole outage, a transformer failure, or a phase failure.

In some implementations, the machine learning system is trained to provide, based on information about a utility system, a system score that is indicative of resiliency of the utility system in response to one or more weather conditions. The data provided to the machine learning system can include an identifier for the particular utility system, a geographic location associated with the particular utility system, or data indicating characteristics of the particular utility system. The system score for the particular utility may be received and provided for display.

In some implementations, a system score is generated for each of multiple different utility systems. The utility systems are then grouped into multiple different groups based on the system scores. Estimates and recommendations for a utility system may be generated using information about the other utility systems in the same group. For example, an amount of time needed to restore service after a service outage in the particular utility system may be estimated based on service restoration times for the one or more other utility systems that are in the group that includes the particular utility system. The estimates or recommendations may then be provided for display.

In some implementations, the machine learning system may be used to estimate the effects of particular weather conditions on a utility system. For example, the machine learning system can be trained to produce, given a geographic location and one or more weather conditions, output indicating likely effects of the one or more weather conditions in causing service outages at the geographic location. Data indicating a set of weather conditions can be accessed. These weather conditions may be a forecast of future weather, historical weather conditions such as those occurring during a particular storm or at a particular time, or a set of weather conditions specified by user input. Outputs of the machine learning system may indicate estimated effects of the set of weather conditions at multiple different geographic locations, e.g., potential damage or disruption at different utility systems and/or at different locations within a single utility system. Based on the outputs, a map showing outages and different effects at different geographic locations can be generated. For example, a heat map showing varying probabilities of a service outage occurring can be shown. The map can be provided for display.

The analysis using the machine learning system can include a variety of types of information. For example, data of solar observations may be incorporated, since solar patterns can impact system performance. This information can be used to examine the impact of geo-magnetic disturbances induced by solar flares or other aspects of solar cycles. As a result, the system can account for various types of high-impact, low-frequency events that may impact utilities. In addition, the information used in training and generating estimates may take into account data indicating different location-specific power generation and disturbance sources. For example, the number of photovoltaic installations in a region may be identified, and may be correlated with outage severity and duration, to examine the extent that areas with solar power generation are affected. In some instances, areas with larger amounts of solar power generation may experience shorter outages after storms.

In general, machine learning algorithms can be used to form an estimated matrix of probabilities used to predict the utility service impact of weather patterns including storms, or other natural phenomena. Results may be recalculated as needed and applied against projected weather data as the data is available to help users determine possible courses of action to prepare or plan for future events. As discussed above, the outputs provided to users can include estimations of system state, e.g., system health, and vulnerability of a utility system to various different types of disturbances. Weather data are related with outage data and other calculated indices, and patterns are presented to the user. For example, one output may indicate system health versus storm strength on a geospatial basis, using a heat map, a topography map, or other graphic. The information in the map may be informed by analysis of a specific group of utilities or events in a regional or national area, rather than using only local data.

A machine learning algorithm can be applied to data from multiple utilities, and the system can use differences in utility performance to suggest areas of improvement and relatively weak spots that are not directly evident on the system for utilities. The system may use geographic distance between utility systems, climate similarity for utility systems, outputs of the machine learning system, and other data to group utilities according to similarity and calculate recommendations. By using data for multiple utility systems, metrics determined by the system can indicate whether a utility's efforts are successful, and can indicate additional patterns specific to that utility and other similar utilities. Grouping utilities can also provide enhanced business information by identifying differences in the root causes of electric service failure. For example, information about how similar systems in various parts of the country handle restoration times for specific types of outages can be used to generate best practices and identify risk factors that can improve service in a variety of locations.

In some implementations, a user can obtain data about a utility system as follows. The user can log in to the user's account. If there are outages to report, the user can enter information about the outages using the reporting features discussed above, for example, using the user interfaces of FIGS. 4-6. The user may obtain a system analysis report, which may include a table of values used and a heat map of any of various factors calculated by the tracking system 110 and the machine learning module 930. The map may show data for all of, or a portion of, geographic area spanned by the user's corresponding utility system.

The user may then input information to simulate the effects of, for example, different weather conditions or maintenance actions. The user may add or subtract layers of data, and could change the assumptions and probabilities calculated by the machine learning algorithm. The user may refresh the map to see the impacts of weather related events, or events related to specific outage causes. In some implementations, the user may view the progressive impact of historic weather events on outages. For example, different stages of a previous storm may be shown, e.g., in time increments of 15 minutes, 1 hour, one day etc., and the status of corresponding outages at those times may be successively shown on the map. The user may select to specific causes of outages and see analysis from the machine learning system regarding patterns over different geographic areas, including relationships between clusters of outages and probabilities of outage occurrence by different weather type.

In some implementations, a user may be provided with suggestions and analysis based on data aggregated from multiple utility systems. For example, utilities X, Y, and Z may be determined by the tracking system 110 to be similar due to similarities in outage causes and weather data. The tracking system may determine aggregate or individual performance averages of these utilities under certain conditions, such as wind speed of 50 MPH. The tracking system may then provide data that indicates whether the user's utility has more or fewer outages under similar conditions. The tracking system may provide data indicating differences between the user's utility and the other utilities, which may help account for differences in performance or highlight areas of potential improvement.

In some implementations, the tracking system accesses census information and provides planning estimates related to population growth and income distribution in a utility's geographic area. This information can be used to make recommendations for prioritizing service restoration or physical improvements for particular customers or areas.

Figure 13:
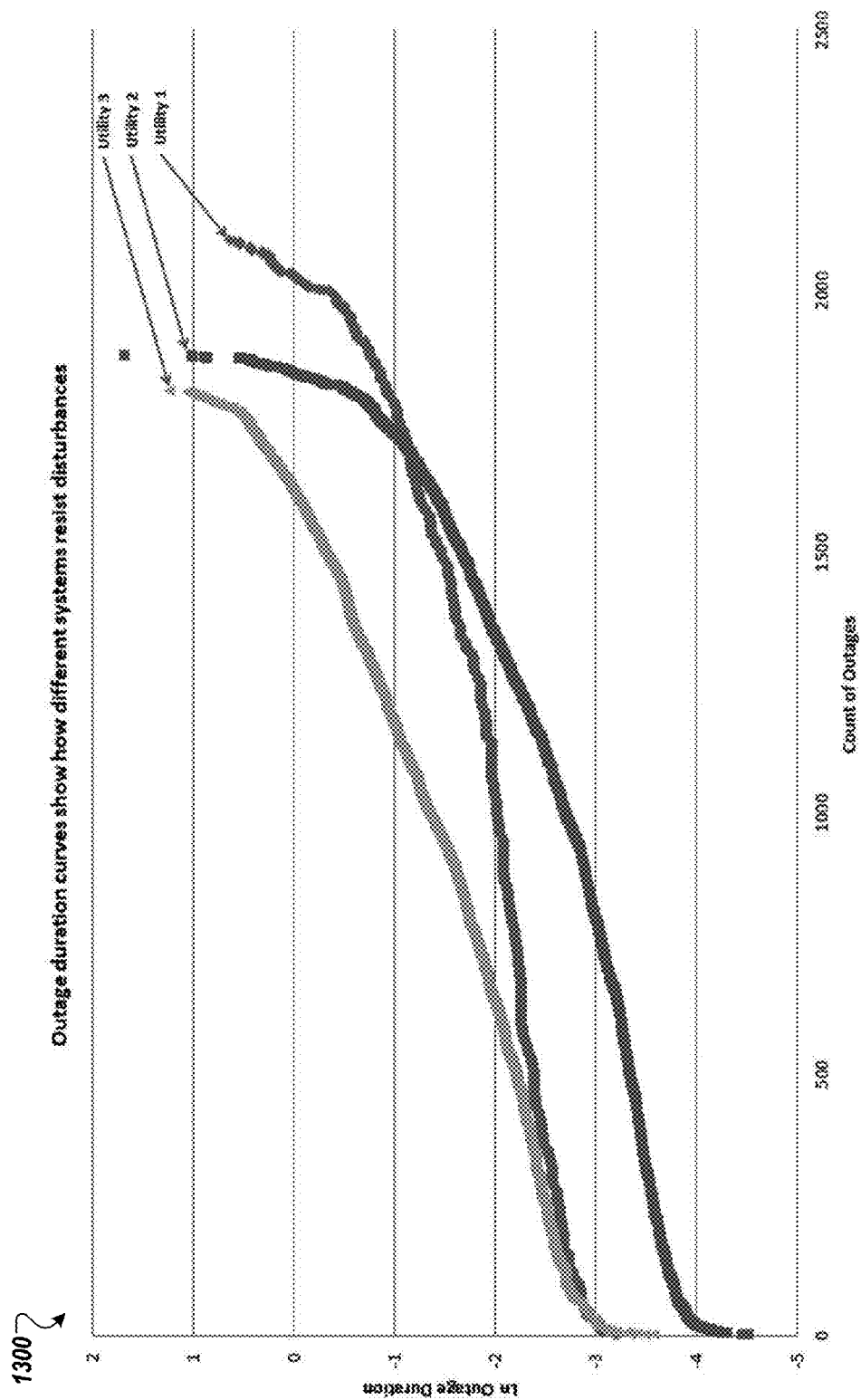
FIG. 13 is a graph illustrating a statistical grouping of utilities based on resiliency curve thresholds.

FIG. 13 is a graph 1300 illustrating a statistical grouping of utilities based on resiliency curve thresholds. In the graph 1300, the horizontal axis measures a count of outages, and the vertical axis indicates outage duration, for example, with duration being measured on a logarithmic scale. The graph 1300 shows curves for three different utilities that show relatively similar patterns of outage occurrence and outage duration characteristics. The similarities in these curves may be used to group utilities together for various purposes, for example, to aggregate data to use in training a machine learning system, or to make comparisons among different utilities or groups of utilities to make estimates and recommendations.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The machine-readable storage device may be a non-transitory machine-readable storage device. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, a social networking platform, rather than an external application, may perform employment analysis and provide employment information to users of the social networking platform. Accordingly, other implementations are within the scope of the following claims.

What is claimed is:

1. A method performed by one or more computers, the method comprising:
   providing, by a server system, a web-based user interface permitting users to indicate service outages for multiple different utilities;
   receiving, at the server system and from one or more client devices, user inputs provided through the web-based user interface, the user inputs respectively indicating service outages of the multiple different utilities;
   accessing weather data that indicates different weather conditions occurring over a range of time in a geographic area including areas served by the multiple different utilities;
   aggregating outage data that indicates the service outages indicated by the user inputs, wherein the outage data indicates, for each of the service outages, a corresponding time of occurrence, a corresponding utility of the multiple different utilities, and a corresponding geographic location in the geographic area;
   based on the weather data and the aggregated outage data, identifying, for each of the service outages, a weather condition that occurred at the corresponding geographic location of the service outage at the corresponding time of occurrence of the service outage;
   determining, for each of the multiple different utilities, a custom beta function for the utility based on the outage data, each custom beta function indicating what type of event is considered a major outage event for the utility, wherein one or more of the custom beta functions differ from a 2.5 beta function and have, in place of a value of 2.5, a custom value that deviates from 2.5;
   training a machine learning system to estimate effects of weather conditions on at least some of the multiple different utilities using (i) the service outages of each of the multiple different utilities and (ii) the identified weather conditions for the service outages of the multiple different utilities, the machine learning system being trained to estimate, given a geographic location and one or more weather conditions, effects of the one or more weather conditions in causing service outages at the geographic location;
   after training the machine learning system, providing, as input to the trained machine learning system, (i) identifying data that identifies a particular utility of the multiple different utilities, the identifying data that identifies the particular utility comprising an identifier for the particular utility or a geographic location corresponding to the particular utility, and (ii) data that identifies a set of weather conditions;
   in response to providing the identifying data for the particular utility, receiving from the trained machine learning system, outputs indicating estimated effects of the set of weather conditions on the particular utility indicated by the identifying data, the outputs indicating different estimated effects of the set of weather conditions at multiple different geographic locations served by the particular utility;
   generating, based on the outputs of the machine learning system, a map that indicates different effects of the set of weather conditions at the different geographic locations served by the particular utility; and
   providing, by the server system and to a client device over a network, data causing the client device to display the map that indicates the different effects of the set of weather conditions at the different geographic locations served by the particular utility.

2. The method of claim 1, wherein accessing the outage data comprises accessing outage data that indicates electric power outages of multiple different electric utilities, the outage data indicating, for each of the electric power outages, (i) an outage type selected from a set of multiple different outage types and (ii) a cause attributed to the electric power outage that is selected from a set of multiple different outage causes;

wherein training the machine learning system comprises training the machine learning system to generate, given a set of weather conditions, outputs that include probabilities that electrical power outages will occur at different geographic locations in response to the set of weather conditions, wherein the outputs further indicate:
predicted outage types, from the set of multiple outage types, corresponding to the different geographic locations; and
predicted outage causes, from the set of multiple different outage causes, corresponding to the different geographic locations.

3. The method of claim 2, wherein the multiple different outage causes comprise vandalism, accident, fire, excavation, lightning, wildlife, weather, vegetation, or equipment failure; and
wherein the multiple different outage types include a pole outage, a transformer failure, or a phase failure.

4. The method of claim 1, wherein training the machine learning system to estimate effects of weather conditions on at least some of the multiple different utilities comprises training the machine learning system to provide, based on information about a utility, a system score that is indicative of resiliency of the utility in response to one or more weather conditions, the system score for a utility representing an aggregate measure of system health of the utility as an emergent property of construction, engineering, maintenance, and cost decisions affecting the infrastructure of the utility;
wherein receiving from the trained machine learning system, output indicating estimated effects of future weather conditions on the particular utility comprises receiving a system score for the particular utility; and
wherein providing, for display, information that indicates the estimated effects of future weather conditions on the particular utility comprises providing the system score of the particular utility for display.

5. The method of claim 4, further comprising receiving, from the trained machine learning system, a respective system score for each of multiple different utilities;
grouping the utilities into multiple different groups based on the respective system scores for the multiple different utilities, the multiple different groups comprising a group that includes the particular utility and one or more other utilities;
estimating an amount of time needed to restore service after a service outage in the particular utility based on service restoration times for the one or more other utilities that are in the group that includes the particular utility; and
providing, by the server system and for display at the client device, the estimated amount of time needed to restore service after a service outage in the particular utility.

6. The method of claim 1, further comprising accessing data indicating forecasted future weather conditions;
wherein providing, to the trained machine learning system, the data that identifies the set of weather conditions comprises providing the data indicating the forecasted future weather conditions;
wherein receiving, from the trained machine learning system, outputs indicating estimated effects of the set of weather conditions at multiple different geographic locations comprises receiving outputs indicating probabilities that service outages will occur, at the different geographic locations served by the particular utility, as a result of the forecasted future weather conditions; and
wherein generating the map comprises generating a map that indicates the probabilities that service outages will occur, at the different geographic locations served by the particular utility, as a result of the forecasted future weather conditions.

7. The method of claim 1, wherein accessing data indicating a set of weather conditions comprises receiving user input indicating weather conditions;
wherein receiving, from the trained machine learning system, outputs indicating estimated effects of the set of weather conditions at multiple different geographic locations comprises receiving outputs indicating probabilities that service outages will occur as a result of the weather conditions indicated by the user input; and
wherein generating the map comprises generating a map that indicates the probabilities that service outages will occur as a result of the weather conditions indicated by the user input.

8. The method of claim 1, wherein training the machine learning system to estimate effects of the one or more weather conditions comprises training the machine learning system to provide an output that indicates:
a likelihood of occurrence of a service outage;
an estimate of a duration of a service outage;
an estimate of number of customers affected by a service outage; or
an estimate of an area affected by a service outage.

9. The method of claim 1, further comprising receiving data indicating social media posts over a period of time;
wherein training the machine learning model comprises training the machine learning model based on correlations among (i) social media trends indicated by the social media posts and (ii) the service outages indicated by the aggregated outage data;
wherein receiving the outputs of the trained machine learning system comprises receiving outputs of the trained machine learning system generated based at least in part on the correlations among the (i) social media trends indicated by the social media posts and (ii) the service outages indicated by the aggregated outage data.

10. The method of claim 1, wherein training the machine learning system comprises training a machine learning system that includes an artificial neural network, a support vector machine, a decision tree, a regression model, a maximum entropy classifier, or a model based on a genetic algorithm, or a model based on a clustering algorithm.

11. The method of claim 1, further comprising:
determining a resiliency curve for the particular utility, the resiliency curve representing counts of outages with respect to different outage durations;
determining one or more other resiliency curves each corresponding to another utility in the set of multiple different utilities, each of the one or more other resiliency curves indicating a count of outages for one of the other utilities with respect to different outage durations;
providing, for display at the client device, (i) the resiliency curve for the particular utility and (ii) the one or more other resiliency curves each corresponding to another utility in the set of multiple different utilities.

12. The method of claim 1, wherein aggregating the outage data comprises aggregating outage data that indicates causes of various service outages, the causes of the various service outages indicating that at least some of the service outages were caused by squirrels;

based on the aggregated outage data and weather data, extrapolating seasonal squirrel migration movements to predict locations where concentrations of squirrel-caused outages will occur;

identifying, based on the extrapolated seasonal squirrel migration movements, a subset of the multiple different utilities that are estimated to experience service outages due to the extrapolated seasonal squirrel migration movements; and providing, to the identified subset of the multiple utilities, a notification that indicates (i) locations where concentrations of squirrel-caused outages are predicted to occur, and (ii) preventative measures for preventing the squirrel-caused outages predicted to occur, the preventative measures comprising at least the use of squirrel guards or covered wire.

13. A system comprising:

one or more computers and one or more storage devices storing instructions that are operable, when executed by the one or more computers, to cause the one or more computers to perform operations comprising:

accessing historical service outage data for each utility in a set of multiple different utilities;

determining, for each of the multiple different utilities, a custom beta function for the utility based on the historical service outage data for the utility, each custom beta function indicating what type of event is considered a major outage event for the utility, wherein one or more of the custom beta functions differ from a 2.5 beta function and have, in place of a value of 2.5, a custom value that deviates from 2.5;

accessing weather data that indicates different weather conditions occurring over a range of time in a geographic area including areas served by the multiple different utilities;

aggregating outage data that indicates service outages of the multiple different utilities, wherein the outage data indicates, for each of the service outages, a corresponding time of occurrence, a corresponding utility of the multiple different utilities, and a corresponding geographic location in the geographic area, wherein the aggregated outage data comprises data indicating service outages of a subset of the multiple different utilities that each have custom beta functions that include a custom value within a particular range of beta values;

based on the weather data and the aggregated outage data, identifying, for each of the service outages, a weather condition that occurred at the corresponding geographic location of the service outage at the corresponding time of occurrence of the service outage;

training a machine learning system to estimate effects of weather conditions on at least some of the multiple different utilities using (i) the service outages of the multiple different utilities, (ii) the identified weather conditions for the service outages of the multiple different utilities, and (iii) the custom values from the custom beta functions for the multiple different utilities corresponding to the service outages, wherein the machine learning system is trained based at least in part based on correlations among service outages for the utilities that have custom values in the particular range and the identified weather conditions associated with the service outages of the utilities that have custom values in the particular range;

after training the machine learning system, providing, as input to the trained machine learning system, the custom beta value for a particular utility of the multiple different utilities;

in response to providing the custom beta value for the particular utility, receiving, from the trained machine learning system, output indicating estimated effects of future weather conditions on the particular utility, the output being generated based at least in part on (i) the custom beta value for the particular utility and (ii) correlations among service outages for the utilities that have custom beta values in the particular range and the identified weather conditions associated with the service outages of the utilities that have custom values in the particular range; and providing, over a network and to a client device, information that causes the client device to display, on a user interface of the client device, a graphical representation of the estimated effects of future weather conditions on the particular utility that are indicated by the output generated by the machine learning system based at least in part on the custom value for the particular utility.

14. The system of claim 13, wherein training the machine learning system to estimate effects of weather conditions on at least some of the multiple different utilities comprises training the machine learning system to provide, based on historical service outage data for the utility, system scores that are each indicative of an overall resiliency of the utility with respect to a different outage cause, each of the system scores being an overall measure, across the area served by the utility, of robustness of infrastructure of the utility against outages of a particular cause or ability to recover from disturbances that cause service outages having the particular cause; and wherein the operations further comprise obtaining from the trained machine learning system, for each of the multiple different utilities, a set of multiple system scores wherein each system score in the set indicates resiliency with respect to a different outage cause.

15. The system of claim 13, wherein training the machine learning system to estimate effects of weather conditions on at least some of the multiple different utilities comprises training the machine learning system to provide, based on historical service outage data for the utility, system scores that are each indicative of an overall resiliency of the utility with respect to a different outage type, each of the system scores being an overall measure, across the area served by the utility, of robustness of infrastructure of the utility against outages of a particular type or ability to recover from disturbances that cause service outages having the particular type;

wherein the operations further comprise obtaining from the trained machine learning system, for each of the multiple different utilities, a set of multiple system scores wherein each system score in the set indicates resiliency with respect to a different outage type in a set of outage types comprising a pole outage, a transformer failure, and a phase failure.

16. A non-transitory computer-readable storage device storing a computer program, the program comprising instructions that when executed by one or more computers cause the one or more computers to perform operations comprising:

receiving outage data indicating service outages of multiple different utilities;

accessing weather data that indicates different weather conditions occurring over a range of time in a geographic area including areas served by the multiple different utilities;

aggregating the outage data to obtain aggregated outage data, wherein the aggregated outage data indicates, for each of a set of service outages, a corresponding time of occurrence, a corresponding utility of the multiple different utilities that is associated with the service outage, and a corresponding geographic location in the geographic area;

based on the weather data and the aggregated outage data, identifying, for each of the service outages indicated by the aggregated outage data, a weather condition that occurred at the corresponding geographic location of the service outage at the corresponding time of occurrence of the service outage;

determining, for each of the multiple different utilities, a custom beta function for the utility based on the outage data, each custom beta function indicating what type of event is considered a major outage event for the utility, wherein one or more of the custom beta functions differ from a 2.5 beta function and have, in place of a value of 2.5, a custom value that deviates from 2.5;

training a machine learning system to estimate effects of weather conditions on at least some of the multiple different utilities using (i) the service outages of the multiple different utilities, (ii) the custom values from the custom beta functions, and (iii) the identified weather conditions for the service outages of the multiple different utilities, the training of the machine learning system configuring the machine learning system to predict effects of weather conditions on electric power substations of a utility based on correlations between service outages of other utilities and weather conditions at the other utilities;

after training the machine learning system, providing, as input to the trained machine learning system, (i) location data indicating a particular geographic area that is served by a particular utility, (ii) a custom value from the custom beta function for the particular utility, and (iii) weather data indicating a set of weather conditions;

in response to providing the location data, the custom value, and the weather data as input to the trained machine learning system, receiving, as output of the trained machine learning system, output indicating service outages estimated to occur in response to the set of weather conditions in the particular geographic area; and providing, based on the output of the trained machine learning system, information that indicates service outages estimated to occur in the particular geographic area.

17. The system of claim 13, wherein the operations further comprise determining an estimated frequency of repairs for the particular utility based on historical outage data for the particular utility and historical outage data for other utilities;

determining, based on the estimated frequency of repairs, an inventory of components needed to complete repairs, at the estimated frequency, over a particular period of time, the determined inventory indicating component types and quantities corresponding to the component types; and providing, to the particular utility, an data indicating the component types and corresponding quantities for completing repairs over the particular period of time.

* * * * *

UNITED STATES PATENT AND TRADEMARK OFFICE
CERTIFICATE OF CORRECTION

| | | |
|---|---|---|
| PATENT NO. | : 9,297,723 B1 | |
| APPLICATION NO. | : 14/541924 | |
| DATED | : March 29, 2016 | |
| INVENTOR(S) | : Alexander Hofmann et al. | |

It is certified that error appears in the above-identified patent and that said Letters Patent is hereby corrected as shown below:

In the Claims

In claim 13, column 27, line 47, before "values;" delete "beta".

Signed and Sealed this
Seventh Day of June, 2016

Michelle K. Lee
*Director of the United States Patent and Trademark Office*